US010189345B2

(12) United States Patent
Iwamitsu et al.

(10) Patent No.: US 10,189,345 B2
(45) Date of Patent: Jan. 29, 2019

(54) CONTROL OF INTERNAL COMBUSTION ENGINE AND ROTATING ELECTRICAL MACHINE FOR VEHICLE

(71) Applicant: HONDA MOTOR CO., LTD., Tokyo (JP)

(72) Inventors: Atsuki Iwamitsu, Wako (JP); Mitsuo Muraoka, Wako (JP); Yoshinori Ando, Wako (JP); Hisashi Ito, Wako (JP); Koichiro Shinozaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/599,654

(22) Filed: May 19, 2017

(65) Prior Publication Data
US 2017/0334281 A1    Nov. 23, 2017

(30) Foreign Application Priority Data
May 20, 2016    (JP) .................. 2016-101852

(51) Int. Cl.
B60K 6/445    (2007.10)
B60K 6/547    (2007.10)
(Continued)

(52) U.S. Cl.
CPC .............. B60K 6/445 (2013.01); B60K 6/448 (2013.01); B60K 6/52 (2013.01); B60K 6/547 (2013.01); B60K 7/0007 (2013.01); B60L 11/14 (2013.01); B60L 15/20 (2013.01); B60L 15/2045 (2013.01); B60L 15/2054 (2013.01); B60W 10/06 (2013.01); B60W 10/08 (2013.01); B60W 20/13 (2016.01); B60K 2007/0092 (2013.01); B60L 2240/423 (2013.01); B60L 2240/441 (2013.01); B60L 2240/443 (2013.01);
(Continued)

(58) Field of Classification Search
CPC .......... B60K 6/445; B60K 6/448; B60K 6/52; B60K 6/547; B60K 2007/0092; B60W 20/13; B60W 10/04; B60W 10/06; B60W 10/08; B60W 30/19; B60W 2510/244; B60W 2540/10; B60W 2540/103; B60W 2710/0666; B60W 2710/083; B60L 11/14; B60L 15/2045; B60L 15/5054
See application file for complete search history.

(56) References Cited

U.S. PATENT DOCUMENTS

2004/0134698 A1*  7/2004  Yamamoto .............. B60K 6/44
                                                                180/65.225

FOREIGN PATENT DOCUMENTS

EP          2093120 A1 *  8/2009  .............. B60K 6/48
JP      2015-123849 A     7/2015

* cited by examiner

Primary Examiner — Huan Le
Assistant Examiner — Lori Wu
(74) Attorney, Agent, or Firm — Westerman, Hattori, Daniels & Adrian, LLP

(57) ABSTRACT

In a vehicle, a first rotating electrical machine, is connected to first wheels via a clutch, and second rotating electrical machines are connected to second wheels or the first wheels without going through the clutch. A power control device allocates electric power to the second rotating electrical machines with higher priority over the first rotating electrical machine when adding additional power to power of an internal combustion engine, thereby generating power of the second rotating electrical machines with higher priority over power of the first rotating electrical machine.

8 Claims, 14 Drawing Sheets

(51) Int. Cl.
  *B60L 11/14*      (2006.01)
  *B60L 15/20*      (2006.01)
  *B60W 10/08*     (2006.01)
  *B60K 6/448*      (2007.10)
  *B60K 6/52*        (2007.10)
  *B60K 7/00*        (2006.01)
  *B60W 10/06*     (2006.01)
  *B60W 20/13*     (2016.01)
  *B60W 10/04*     (2006.01)
  *B60W 10/115*   (2012.01)
  *B60W 20/00*     (2016.01)
  *B60W 30/19*     (2012.01)
  *F16H 3/66*        (2006.01)
  *F16H 3/72*        (2006.01)

(52) U.S. Cl.
  CPC ..... *B60L 2240/507* (2013.01); *B60L 2260/28* (2013.01); *B60W 10/04* (2013.01); *B60W 10/115* (2013.01); *B60W 20/00* (2013.01); *B60W 30/19* (2013.01); *B60W 2510/244* (2013.01); *B60W 2540/10* (2013.01); *B60W 2540/103* (2013.01); *B60W 2710/0666* (2013.01); *B60W 2710/083* (2013.01); *F16H 3/66* (2013.01); *F16H 3/72* (2013.01); *Y02T 10/7258* (2013.01)

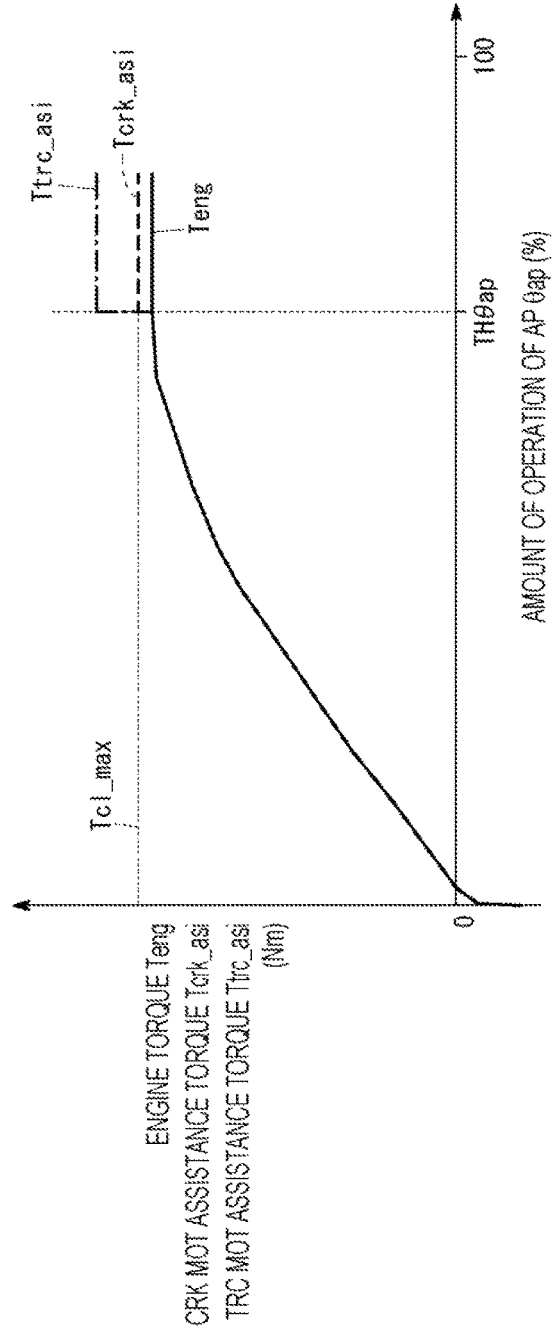

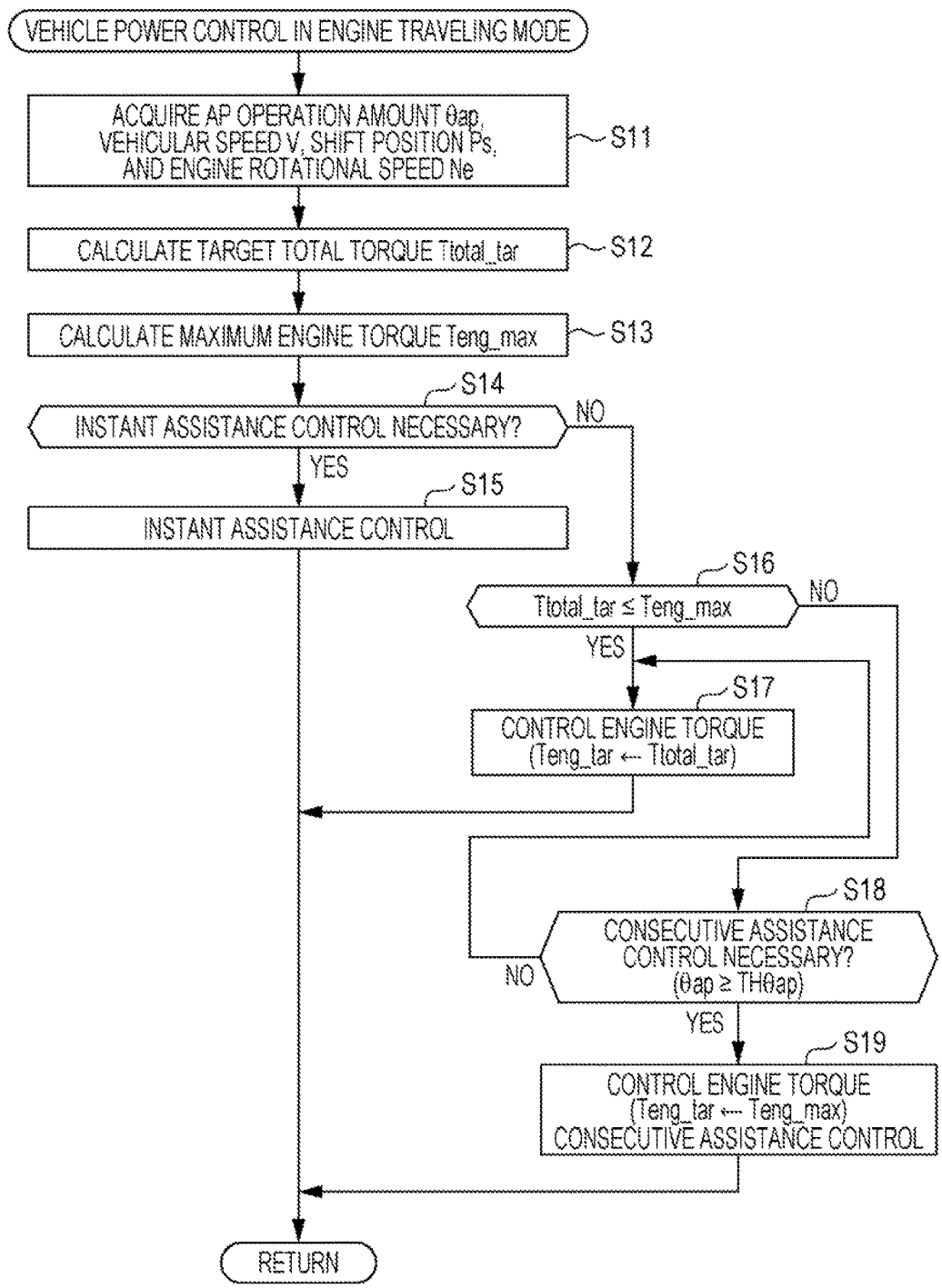

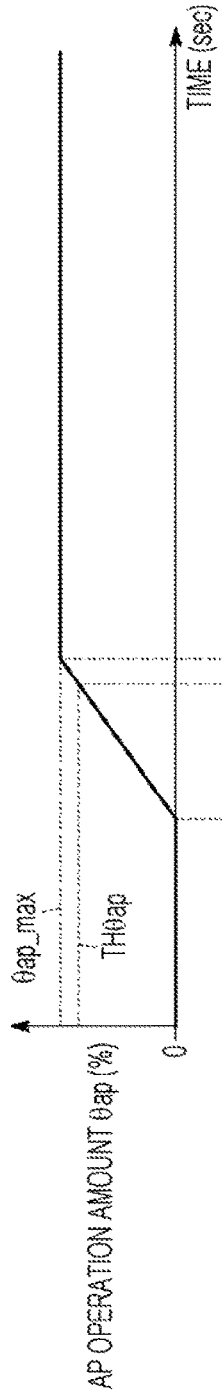
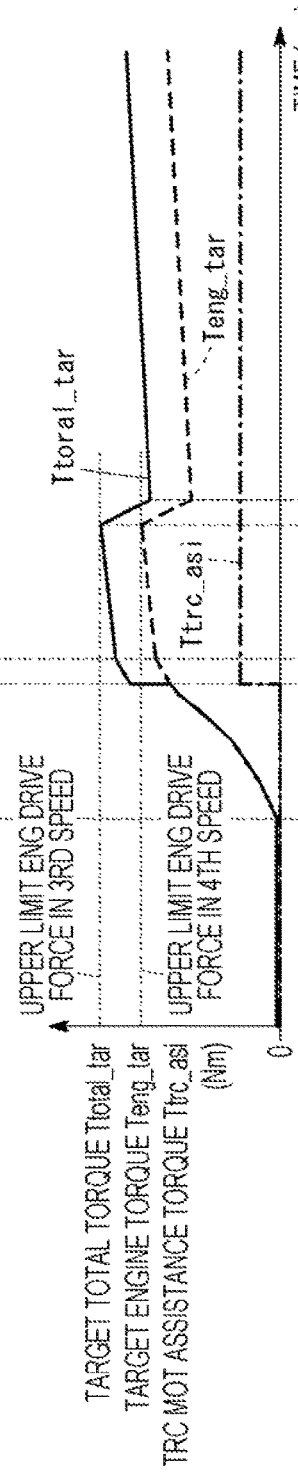
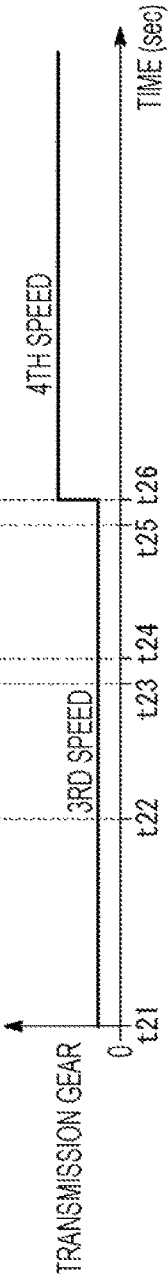
FIG. 13A
FIG. 13B
FIG. 13C

CONTROL OF INTERNAL COMBUSTION ENGINE AND ROTATING ELECTRICAL MACHINE FOR VEHICLE

CROSS REFERENCES TO RELATED APPLICATIONS

Tile present application; claims priority under 35 U.S.C. § 119 to Japanese Patent Application No. 2016-101852, filed May 20, 2016, entitled "Vehicle." The contents of this application are incorporated herein by reference in their entirety.

TECHNICAL FIELD

The present disclosure relates to a vehicle capable of traveling by an engine and multiple rotating electrical machines.

BACKGROUND

Japanese Unexamined Patent Application Publication No. 2015-123843 discloses providing a vehicle capable of effectively using both of an electric motor connected to the same wheels as an internal combustion engine, and an electric motor connected different wheels from an internal combustion engine ([0006], Summary).

To this end, Japanese Unexamined Patent Application Publication No. 2015-123849 (Summary) describes a power control device 28 of a vehicle 10 that controls target vehicle power to be fulfilled by at least one of first electric motors 16 and 18 and an internal combustion engine 12, in a case where the target vehicle power is forward power and clutch units 38a and 38b (FIG. 1) are engaged. The power control device 28 also controls target vehicle power to be fulfilled by at least one of a second electric motor 14 and the internal combustion engine 12, in a case where the target vehicle power is forward power and clutch units 38a and 38b are disengaged.

The first electric motors 16 and 18 (rear-side motors 16 and 13) are connected to clutches 38a and 38b (FIG. 1) that are different front clutches 102, 104 (FIG. 2) of the internal combustion engine 12. The second electric motor 14(forward-side motor 14) is connected to the same clutch 102 as the internal combustion engine 12 (FIG. 2, [0035] through [0057]).

Japanese Unexamined Patent Application Publication No. 2015-123849 illustrates a partial-assist mode (S6 in FIG. 3, and FIGS. 4, 7, and 8) and a full-assist mode (S7 in FIG. 3, and FIGS. 4 through 6) as cases of the internal combustion engine 12 and the second electric motor 14generating traveling drive force at the same time. In full-assist mode, first assist motor switching processing (S14) is performed where assistance is switched from assistance by the rear-side motors 16 and 18 to assistance by the second electric motor 14 in a case where a vehicular speed V does not exceed a first vehicular speed threshold value THv1 (No in S11 in FIG. 5). It is stated that the determination. In step S11 may fee made by another indicator instead, as long as the rotations Nmot of the rear-side motor's 16 and 18 can be estimated ([0070]). The same holds true for the partial-assist mode as well (No in S21 in FIG. 7→S24). The reason that the rotations Nmot of the rear-side motors 16and 18 are made to serve as a reference for determination is stated to be to prevent excessive rotation of the rear-side motors 16 and 18 and so forth ([0100], [0104], [0107]).

Thus, Japanese Unexamined Patent Application Publication No. 2015-123849 describes the forward-side motor 14 being driven instead of the rear-side motors 16 and 18, to prevent excessive rotation of the rear-side motors 16 and 18 connected to the clutches 38a and 38b that are different from the clutches 102 and 104 of the internal combustion engine.

SUMMARY

However, according to study by the inventors, there is room to expand the range of usage of the front-side motor 14 and the rear-side motors 16 and 18. For example, general internal combustion engines exhibit a tendency where power (torque) decreases as the rotational speed increases, when operating in the high-rotation region. Even in a case where such a tendency is present in the configuration in Japanese Unexamined Patent Application Publication No. 2015-123849, the power transmission capacity of the clutches 102 and 104 or a value close thereto can be: generated by the power of the internal combustion engine 12 alone, if the power of the internal combustion engine 12 is equal to or above the power transmission capacity of the clutches 102 and 104. However, the power transmission capacity of the clutches 102 and 104 or a value close thereto cannot be generated by the power of the internal combustion engine 12 alone if the power of the internal combustion engine 12 is less than the power transmission capacity of the clutches 102 and 104 at the high-rotation region. In this case, there is room to increase transmittable power via the clutches 102 and 104.

Control of the forward-side motor 14 that focuses on the power transmission capacity of the clutches 102 and 104 can also be applied to the low-rotation region. Further, in a case where the second motors 16 and 18 connected to clutches 38a and 38b that differ from the clutches 102 and 104 of the internal combustion engine 12 do not readily exhibit excessive rotations, the rear-side motors 16 and 18 can be used with priority, taking into consideration the power transmission capacity of the clutches 102 and 104 as described above.

The present application describes, for example, providing a vehicle where an internal combustion engine can foe suitably assisted by multiple rotating electric machines, A vehicle includes an internal combustion engine, a transmission, a clutch interposed between the internal combustion engine and the transmission, a first rotating electrical machine connected to a first wheel via the clutch, a second rotating electrical machine connected to a second wheel or the first wheel without going through the clutch, an electric power storage device that supplies electric power to the first rotating electrical machine and the second rotating electrical machine, and a power control device that controls power of the internal combustion engine, the first rotating electrical machine, and the second rotating electrical machine. The power control device allocates the electric power to the second rotating electrical machine with priority over the first rotating electrical machine when adding additional power to power of the internal combustion engine, thereby generating power of the second rotating electrical machine with priority over power of the first rotating electrical machine.

According to the present disclosure, for example, electric power is allocated to the second rotating electrical machine with priority over the first rotating electrical machine when adding additional power to power of the internal combustion engine, thereby generating power of the second rotating electrical machine with priority over power of the first rotating electrical machine. Accordingly, even in a case where there is a possibility that the sum of the power of the internal combustion engine and the additional power will exceed the maximum transmission power of the clutch for example, the power of the second rotating electric machine (rotating electric machine connected to the second wheels or the first wheels without going through the clutch) is generated with higher priority, so the total power can be increased in a stable manner (e.g., rapid acceleration).

In a case of allocating electric power to the first rotating electric machine in addition to the second rotating electric machine, generating additional power at both the first rotating electric machine and the second rotating electric machine enables a relatively great total power to be generated.

The power control device may calculate additional power of the second rotating electrical machine in accordance with a discharge limit (power rating) of the electrical power storage device, and an output limit (build) of the second rotating electrical machine. The power control device may also calculate additional power of the first rotating electrical machine in accordance with the discharge limit (power, rating) of the electric power storage device reflecting additional power of the second rotating electrical machine, and an output limit (build) of the first rotating electrical machine.

Accordingly, the additional power of the second rotating electrical machine can be maximized within a range permitted by the discharge limit (power rating) of the electrical power storage device and the output limit (build) of the second rotating electrical machine. Additionally, additional power of the first rotating electrical machine can be maximized within a range permitted by the discharge limit (power rating) of the electric power storage device reflecting additional power of the second rotating electrical machine and the output limit (build) of the first rotating electrical machine. Thus, the total power can be maximized.

In a case where an operation amount of an accelerator pedal exceeds an operation amount threshold value, and also the additional power is to be added to power of the internal combustion engine, the power control device may calculate the additional power of the second rotating electrical machine in accordance with the discharge limit (power rating) of the electric power storage device and the output limit (build) of the second rotating electrical machine, and calculate the additional power of the first rotating electrical machine in accordance with the discharge limit (power rating) of the electric power storage device reflecting additional power of the second rotating electrical machine and the output limit, (build) of the first, rotating electrical machine.

Accordingly, in a case where the driver has an intent of acceleration, or in a case wherein the intent of acceleration by the driver is strong, the additional power of the second rotating electrical machine can be maximized within a range permitted by the discharge limit (power rating) of the electrical power storage device and the output limit (build) of the second rotating electrical machine. Additionally, additional power of the first rotating electrical machine can be maximized within a range permitted by the discharge limit (power rating) of the electric power storage device reflecting additional power of the second rotating electrical machine and the output limit (build) of the first rotating electrical machine. Accordingly, even in a case where there is a possibility that the sum of the power of the internal combustion engine and the additional power will exceed the maximum transmission power of the clutch, the power of the second rotating electric machine is generated with higher priority, so the total power can be increased in a stable manner (e.g., rapid acceleration), and the total power can be maximized.

In a case; where an operation amount of an accelerator pedal exceeds an operation amount threshold value, and also the additional power is to be added to power of the internal combustion engine, the power control device: may generate power of the second rotating electrical machine with higher priority than the power of the first rotating electrical machine. Further, in a case where an operation amount of the accelerator pedal is below the operation amount threshold value, and also the additional power is to be added to power of the internal combustion engine, the power control device may generate power of the first rotating electrical machine with higher priority than the power of the second rotating electrical machine.

Accordingly, in a case where the operation amount of the accelerator pedal is below the operation amount threshold value, i.e., in a case where there is no intent to accelerate by the driver or the intent to accelerate by the driver is weak, power of the first rotating electrical machine connected to the first wheels via the clutch (i.e., at the side as the internal combustion engine) is used. Thus, acceleration with consistency can be realized at the same first wheels.

Also, in a case where the operation amount of the accelerator pedal exceeds the operation amount threshold value, i.e., in a case where there is intent to accelerate by the driver or the intent to accelerate by the driver is strong, power of the second rotating electrical machine connected to the wheels without going through the clutch (i.e., at a different side from the internal combustion engine) is used. Thus, even in a case where there is a possibility that the sum of the power of the internal combustion engine and the additional power will exceed the maximum transmission power of the clutch, the total power can be increased in a stable manner.

The vehicle may further include a kick-down switch that that performs kick-down, where the transmission is shifted down, in a case where a predetermined depressing operation has been performed at the accelerator pedal. The power control device may set the operation amount threshold value to a kick-down threshold value that is the operation amount where the kick-down switch turns on or a value reflecting a tolerance value in the kick-down threshold value.

Which of the first rotating electrical machine and the second rotating electrical machine to give priority to is thus switched in accordance with whether or not there is rapid acceleration accompanying a kick-down (i.e., in accordance with driver intent to accelerate). Accordingly, additional power can be generated in accordance with acceleration intent of the driver.

According to the present disclosure, for example, the internal combustion engine can be suitably assisted by multiple rotating electrical machines.

BRIEF DESCRIPTION OF THE DRAWINGS

The advantages of the disclosure will become apparent in the following description taken in conjunction with the following drawings.

FIG. 3 is a diagram illustrating the relationship between motors that operate under motor assistance control and amount of operation of an accelerator pedal (accelerator pedal operation amount) according to the embodiment.

FIG. 4 is a diagram illustrating the relationship between the accelerator pedal operation amount at a high vehicular speed and torque of each drive source, in an engine traveling mode according to the embodiment.

FIG. 5 is a flowchart of vehicle power control in the engine traveling mode according to the embodiment.

FIG. 13A is a diagram illustrating a first example of temporal change in the accelerator pedal operation amount according to the embodiment.

FIG. 13B is a diagram illustrating an example of target total torque; in accordance with the accelerator pedal operation amount in FIG. 13A, target engine torque, and traction motor assistance torque.

FIG. 13C is a diagram illustrating an example of transmission gears corresponding to FIGS. 13A and 13B.

DETAILED DESCRIPTION

A. Embodiment
A-1. Configuration
A-1-1. Overall Configuration

Figure 1:
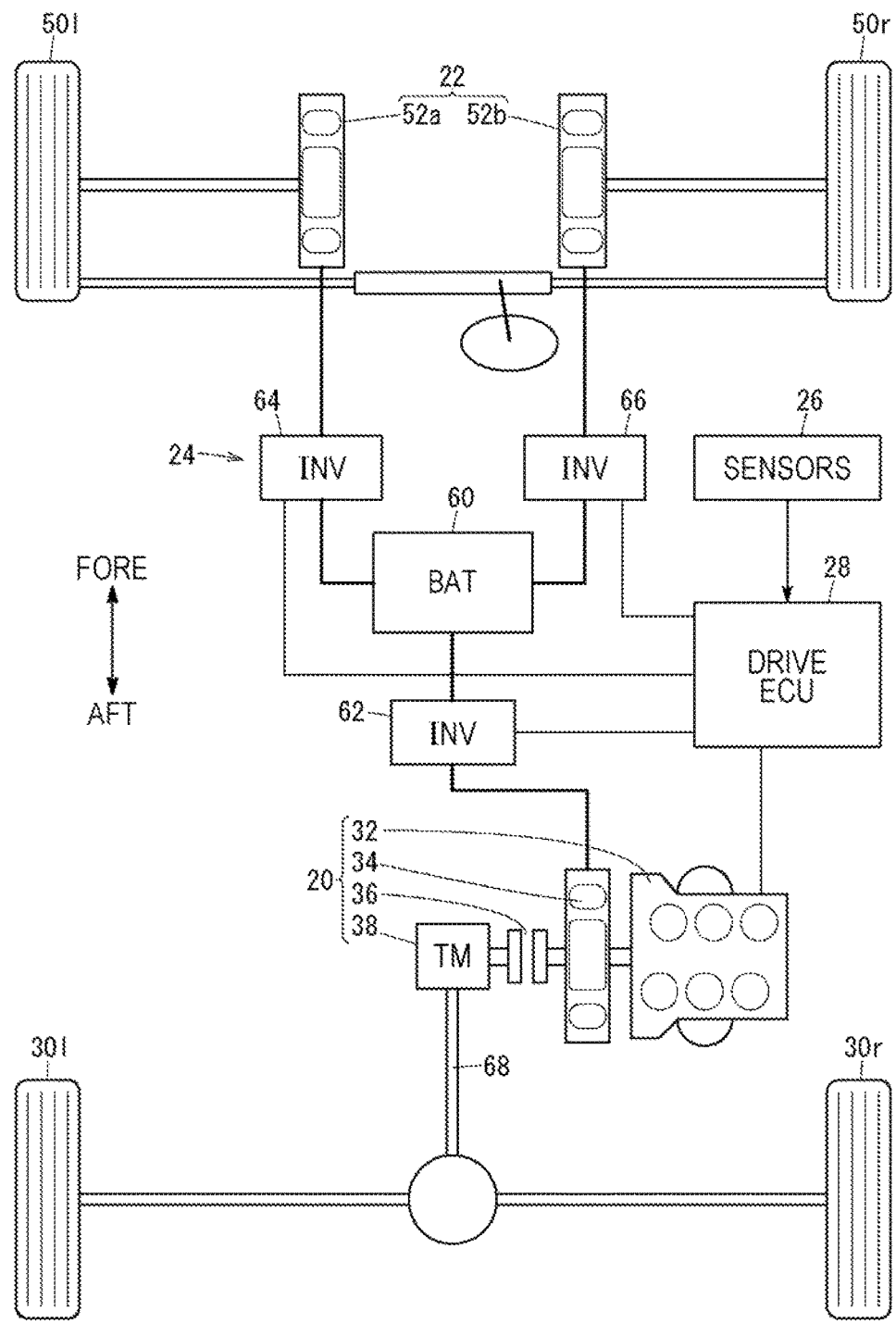
FIG. 1 is a schematic configuration diagram of a part of a vehicle according to an embodiment of the present disclosure.

FIG. 1 is a schematic diagram illustrating a part of a vehicle 10 according to an embodiment of the present disclosure. The vehicle 10 includes a rear wheel drive device 20, a front wheel drive device 22, an electric system 24, sensors 26, and a drive electronic control device 28 (hereinafter referred to: as "drive ECU 28", or simply "ECU 28").

The rear wheel drive device 20 drives a left rear wheel 30l and a right rear wheel 30r (hereinafter collectively referred to as "rear wheels 30l and 30r" or simply "rear wheels 30". The rear wheel drive device 20 includes an engine 32, a first travelling motor 34, a clutch 36, and a transmission 38.

The front wheel drive device 22 drives a left front wheel 50l and a right front wheel 50r (hereinafter collectively referred to as "front wheels 50l and 50r" or simply "front wheels 50". The front wheel drive device 22 includes a second travelling motor 52a and a third travelling motor 52b. The rear wheel drive device 20 and front wheel drive device 22 are mechanically not connected, and are provided separately and independently.

The electric system 24 supplies electric power to the first through third travelling motors 34, 52a, and 52b, and has a high-voltage battery 60 and first through third inverters 62, 64, and 66. The drive ECU 28 controls the power of the engine 32 and the first through third travelling motors 34, 52a, and 52b.

A-1-2. Rear Wheel Drive Device 20

The rear wheel drive device 20 performs driving by the engine 32 alone when under a medium load, for example, and performs driving by the engine 32 and the first motor 34 when under a heavy load. An arrangement may be made where driving is performed by the first motor 34 alone when the vehicle 10 is under a light load.

The engine 32 is a six-cylinder engine for example, but may be a two-cylinder, four-cylinder, eight-cylinder, or other engine. The engine 32 is not restricted to being a gasoline engine, and may be a diesel engine or another like engine.

Although the engine 32 and first, travelling motor 34 are illustrated in FIG. 1 as being disposed near the rear-wheels 30, to facilitate understanding of the relationship of being coupled to the rear wheels 30, the engine 32 and first travelling motor 34 may be disposed within an engine compartment (omitted from illustration) provided at the forward side of the vehicle 10. The transmission 38 may be connected to the rear wheels 30 via a propeller shaft 68.

The first, travelling motor 34 generates traveling power for the vehicle 10, and also generates electricity under power from the engine 32. The first travelling motor 34 performs cranking where a crankshaft, of the engine 32, omitted from illustration, is rotated when starting the engine 32.

The first motor 34 is a three-phase AC brushless motor for example, but may be a three-phase AC brushed motor, a single-phase AC motor, a DC motor, or other like motor. The specifications of the first motor 34 may be the same as, or different from, the second motor 52a and third motor 52b. The first motor 34 is capable of generating torque in both forward rotation (rotation that causes the vehicle 10 to travel forward) and reverse rotation (rotation that causes the vehicle 10 to travel backwards).

Hereinafter, the first travelling motor 34 may be referred to as a "cranking motor 34", abbreviated to "CRK MOT 34", or simply "motor 34". Although a cranking motor (starter) is not provided separately from the first travelling motor 34 in the present embodiment, such a separate cranking motor may be provided. The power of the engine 32 and first travelling motor 34 is also referred to as "rear wheel power".

The clutch 36 is interposed between the combination of the engine 32 and CRK MOT 34, and the transmission 38. When the clutch 36 is on (engaged state), the power from the engine 32 and the CRK MOT 34 can be transmitted to the rear wheels 30, and further, power from the rear wheels 30 can be transmitted to the CRK MOT 34 for regeneration. When the clutch 36 is off (disengaged state), the power from the engine 32 and the CRK MOT 34 is not transmitted to the rear wheels 30. In this case, the CRK MOT 34 can generate electricity by power from the engine 32.

The transmission 38 according to the present embodiment is an automatic transmission. However, the transmission 38 may be a manual transmission, or another like transmission.

A-1-3. Front Wheel Drive Device 22

The output shaft of the second motor 52a is connected to the rotation axle of the left front wheel 50l and transmits drive force to the left front wheel 50l. The output shaft of the third travelling motor 52b is connected to the rotation shaft of the right front wheel 50r and transmits drive force to the right front wheel 50r. A clutch and/or reducer, omitted from illustration, may be interposed between the second travelling motor 52a and third travelling motor 52b, and the front wheels 50.

The second travelling motor 52a and third travelling motor 52b generate traveling power for the vehicle 10, and also generate electricity under power from the front wheels 50. Hereinafter, the second travelling motor 52a and third travelling motor 52b may be abbreviated to "TRC MOT 52a and 52b", or simply "motors 52a and 52b", or may be collectively referred to as "TRC MOT 52" or simply "motor(s) 52". The power transmitted from the front wheel drive device 22 to the front wheels 50 is also referred to as "front wheel power".

The second motor 52a and third motor 52b are three-phase AC brushless motors for example, but may foe. three-phase AC brushed motors, single-phase AC motors, DC motors, or other like motors. The specifications of the travelling motor 52a and third motor 52b may be the same as, or different from, the first travelling motor 34.

A-1-4. Electric System 24

The high-voltage battery 60 supplies electric power to the first through third motors 34, 52a, and 52b, via the first through third inverters 62, 64, and 66, and also is charged by a regenerative power Preq from the first through third motors 34, 52a, and 52b. The battery 60 is an electric power storage device (energy storage) including multiple battery cells. Examples of batteries that can be used include lithium-ion secondary batteries, nickel-metal hydride secondary batteries, and so forth. Electric power-storage devices such as capacitors or the like may be used instead of the battery 60. A DC/DC converter, omitted from illustration, may be interposed between the battery 60 and the first through third inverters 62, 64, and 66, and step up or step down output voltage of the high-voltage battery 60 or output voltage of the first through third motors 34, 52a, and 52b.

The first through third inverters 62, 64, and 66 are three-phase full-bridge configurations that convert DC/AC. That is to say, the first through third inverters 62, 64, and 66 convert DC into three-phase AC and supply to the first through third motors 34, 52a, and 52b. The first through third inverters 62, 64, and 66 also supply AC/DC-converted DC from regeneration operations of the first through third motors 34, 52a, and 52b to the battery 60.

A-1-5. Sensors 26

Figure 2:
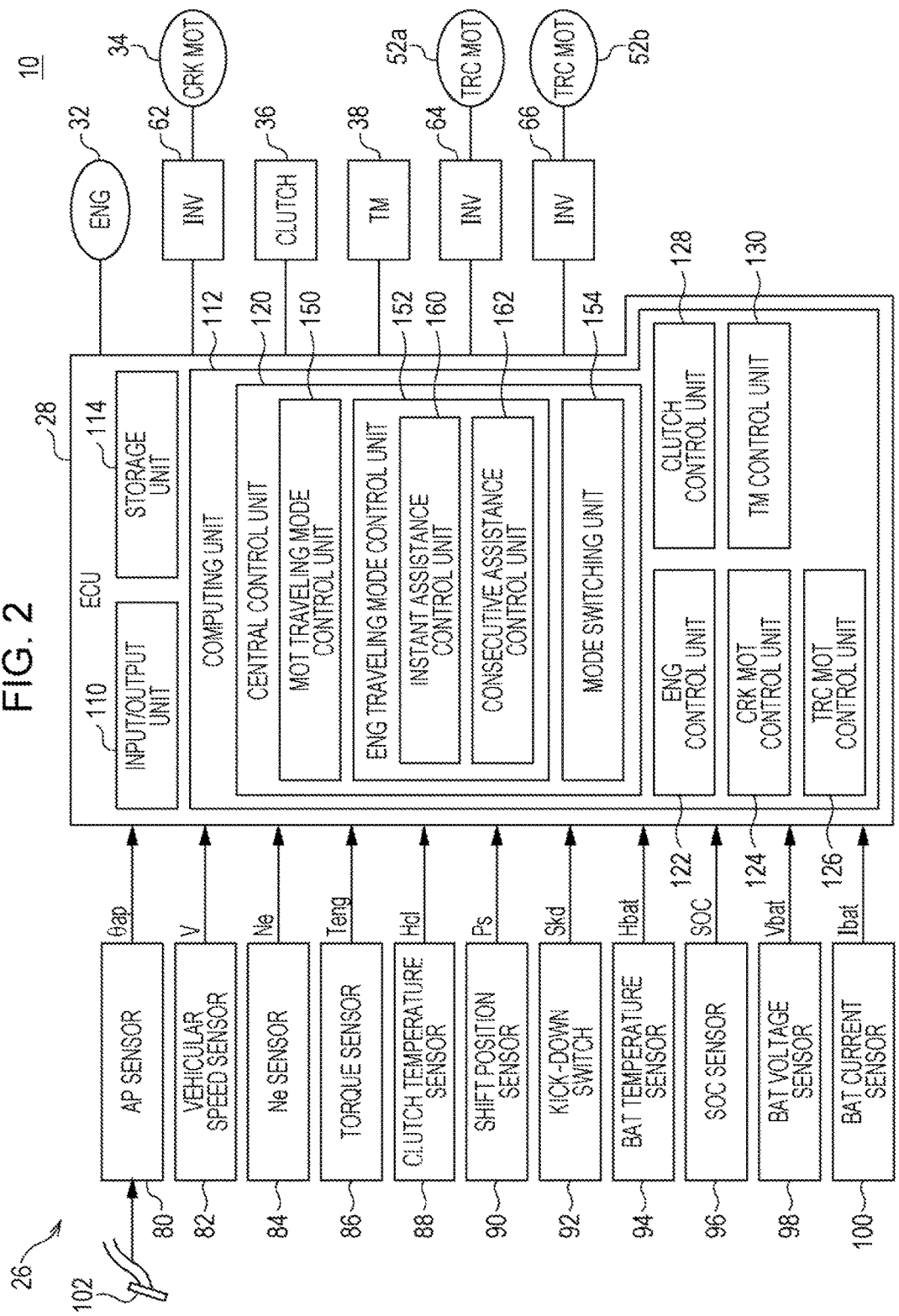
FIG. 2 is a block drawing illustrating the details of sensors and a drive electronic control device of the embodiment.

FIG. 2 is a block diagram illustrating the sensors 26 and ECU 28 according to the present embodiment in detail. It can be seen from FIG. 2 that the sensors 26 includes an accelerator pedal sensor 80, a vehicular speed sensor 82, an engine rotational speed sensor 84, an engine torque sensor 86, a clutch temperature sensor 88, a shift position sensor 90, a kick-down switch 92, a battery temperature sensor 94, a state of charge (SOC) sensor 96, a battery voltage sensor 98, and a battery current sensor 100.

The accelerator pedal sensor 80 (hereinafter, also "AP sensor 80") detects an operation amount θap of an accelerator pedal 102 (hereinafter also "AP operation amount θap"), in terms of %. The vehicular speed sensor 82 detects vehicular speed V of the vehicle 10 in terms of km/h.

The engine rotational speed sensor 84 (hereinafter also "Ne sensor 84") detects engine rotational speed Ne as the engine revolutions per unit of time (rpm). The engine torque sensor 86 (hereinafter also "torque sensor 86") detects torque Teng generated by the engine (hereinafter also "engine torque Teng" or "engine-generated torque Teng").

The clutch temperature sensor 88 detects temperature Hcl of the clutch 36 (hereinafter also "clutch temperature Hcl"). The shift position sensor 90 detects a shift position Ps. The transmission gears of the transmission 38 are included in the shift position Ps. The shift position Ps is used to determine whether a gearshift change is being performed or not (particularly shifting up).

The kick-down switch 32 detects a kick-down signal Skd by detecting kick-down operations by the driver, based on the operation amount θap of the accelerator pedal 102. The kick-down switch 92 is used to perform kick-down, where the transmission 38 is shifted down when a predetermined depressing operation has been performed at the accelerator-pedal 102 (described later in detail with reference to FIG. 7 and others).

The battery temperature sensor 94 (hereinafter also "BAT temperature sensor 94") detects temperature Hbat of the battery 60 (hereinafter also "battery temperature Hbat"). The SOC sensor 96 detects the SOC of the battery 60. The battery voltage sensor 98 (hereinafter also "BAT voltage sensor 98") detects input/output voltage Vbat of the battery 60 (hereinafter also "voltage Vbat" or battery voltage Vbat"). The battery current sensor 100 (hereinafter also "BAT current sensor 100") detects input/output current Ibat of the battery 60 (hereinafter also "current Ibat" or battery current Ibat"). The temperature Hbat, voltage Vbat, and current Ibat of the battery 60 are used for calculation of discharge limit value Pbat_lim (output limit) of the battery 60.

A-1-6. Drive ECU 28

The drive ECU 28 controls the engine 32 and the first through third inverters 62, 64, and 66, thereby controlling the output of the engine 32 and the first through third motors 34, 52a, and 52b. The drive ECU 28 further controls the clutch 36 and the transmission 38 in addition to the engine 32 and first through third inverters 62, 64, and 66, thereby controlling the power Fv of the entire vehicle 10.

The drive ECU 28 includes an input/output unit 110, a computing unit 112, and a storage unit 114, as illustrated in FIG. 2. The input/output unit 110 performs input/output of signals between the ECU 28 and other parts. The input/output unit 110 may include an operation input/output-device (human-machine interface (HMI)) for passengers (including the driver).

The computing unit 112 controls the power Fv of the vehicle 10 toy executing a program stored in the storage unit 114, and is configured from a central processing unit (CPU), for example. The computing unit 112 includes a central control unit 120, an engine control unit 122, a crank motor control unit 124, a traction motor control unit 126, a clutch control unit 128, and a transmission control unit 130, as illustrated in FIG. 2.

The central control unit 120 controls the power Fv of the entire vehicle 10. The central control unit 120 includes a motor traveling mode control unit 150, an engine traveling mode control unit 152, and a mode switching unit 154.

The motor traveling mode control unit 150 (hereinafter also "MOT traveling mode control unit 150") performs various types of control when the traveling mode of the vehicle 10 is in a motor traveling mode. The engine traveling mode control unit 152 (hereinafter also "ENG traveling mode control unit 152") performs various types of control when the traveling mode of the vehicle 10 is in an engine traveling mode. The ENG traveling mode control unit 152 has an instant assistance control unit 160 and a consecutive assistance control unit 162. The instant assistance control unit 160 executes later-described instant assistance control. The consecutive assistance control unit 162 executes later-described consecutive assistance control. The mode switch unit 154 switches the traveling mode.

The engine control unit 122 (hereinafter also "ENG control unit 122") controls the engine 32 through adjustment of fuel injection amount, ignition control of the engine 32, adjustment of the opening angle of a throttle valve (omitted from illustration), and so forth.

The crank motor control unit 124 (hereinafter also "CRK MOT control unit 124") controls the CRK MOT 34 through control of the inverter 62 and so forth. The traction motor control unit 126 (hereinafter also "TRC MOT control unit 126") controls the TRC MOT 52*a* and 52*b* through control of the inverters 64 and 66 and so forth. The clutch control unit 128 controls the engagement state of the clutch 36.

The transmission control unit 130 (hereinafter also "TM control unit 130") controls the transmission gear of the transmission 38 using the AP operation amount θap, vehicular speed V, kick-down signal Skd, and so forth.

The storage unit 114 (FIG. 2) stores programs and data that the computing unit 112 uses. The storage unit 114 has random access memory (RAM), for example. Examples of RAM that can be used include volatile memory such as registers, and nonvolatile memory such as flash memory and so forth. The storage unit 114 may also include read-only memory (ROM) in addition to the RAM.

Note that the programs and data that the computing unit 112 uses are presumably stored in the storage unit 114 of the vehicle 10 in the present embodiment. However, part of the programs and data may be acquired from an external server (omitted from illustration) via a wireless device (omitted from illustration) included in the input/output unit 110, for example.

The drive ECU 28 may be a combination of multiple ECUs. For example, the drive ECU 28 may be configured as a combination of multiple ECUs provided corresponding to each of the engine 32 and first through third motors 34, 52*a*, and 52*b*, and ECUs managing the drive state of the engine 32 and the first through third motors 34, 52*a*, and 52*b*.

A-2. Vehicle Power Control

A-2-1. Overview

The present embodiment uses a motor traveling mode where the vehicle 10 is driven by the TRC MOT 52*a* and 52*b*, and an engine traveling mode where the vehicle 10 is driven primarily by the engine 32. The engine traveling mode includes a hybrid mode in which additional power from the motors 34, 52*a*, and 52*b* (additional torque in the control according to the present embodiment) is added as necessary.

The mode switching unit 154 of the ECU 28 switches the traveling mode primarily based on vehicular speed V and AP operation amount θap according to the present embodiment. For example, in a case where the vehicular speed of the vehicle 10 is slow and the AP operation amount θap does not exceed an operation amount threshold value THθap, the ECU 28 selects the motor traveling mode. In a case where the vehicular speed of the vehicle 10 is medium speed or fast and the AP operation amount θap does not exceed the operation amount threshold value THθap, the ECU 28 selects the engine traveling mode. Further, in a case where the AP operation amount θap exceeds the operation amount threshold value THθap in the engine travelling mode, the ECU 28 selects the hybrid mode.

When traveling at slow speeds, electricity can be generated by the CRK motor 34 by driving the CRK motor 34 by the engine 32 in a state where the engine 32 and the transmission 38 are disengaged (or engaged) by the clutch 36. The electric power that is thus generated can be supplied to the TRC MOT 52*a* and 52*b* or to accessories omitted from illustration, or can be used to charge the battery 60. In other words, the CRK motor 34 can be used as an electricity generator.

The ECU 28 further controls the power of the engine 32 and the first through third motors 34, 52*a*, and 52*b*, using the AP operation amount θap and so forth for each vehicular speed V. The power of the engine 32 and the first through third motors 34, 52*a*, and 52*b* is controlled in terms of torque (Nm) in the control according to the present embodiment. Note however, that, the power of the engine 32 and first through third motors 34, 52*a*, and 52*b* may be controlled in terms of drive force in increments of Newtons (N).

Hereinafter, the torque of the engine 32 will be referred to as "engine torque Teng" or simply "torque Teng". The torque of the first motor 34 will be referred to as "CRK MOT torque Tcrk", "motor torque Tcrk", or simply "torque Tcrk". The torque Tcrk in a case of assisting the engine 32 will be referred to in particular as "CRK MOT assistance torque Tcrk_asi" or "assistance torque Tcrk_asi". The torque of the second motor 52*a* and third motor 52*b* will be referred to as "TRC MOT torque Ttrc", "motor torque Ttrc", or simply "torque Ttrc". The torque Ttrc in a case of assisting the engine 32 will be referred to in particular as "TRC MOT assistance torque Ttrc_asi" or "assistance torque Ttrc_asi". The torque of the first through third motors 34, 52*a*, and 52*b* will be collectively referred to as "motor torque Tmot" or simply "torque Tmot". The torque Tmot in a case of assisting the engine 32 will be referred to in particular as "motor assistance torque Tmot_asi" or "assistance torque Tmot_asi".

A-2-2. Motor Assistance Control

In the engine traveling mode (including the hybrid mode), the ECU 28 executes motor assistance control so that the motors 34, 52*a*, and 52*b* assist the engine 32. Motor assist control is used in a case of running the engine 32 to drive the vehicle 10 primarily by the engine 32, or in a case where the vehicle 10 is being driven primarily by the engine 32.

Motor assistance control includes instant assistance control and consecutive assistance control. Instant assistance control is control where, when running the engine 32, response delay in engine torque Teng is instantaneously supplemented by motor torque Tmot (particularly CRK MOT torque Tcrk in the present embodiment). Consecutive assistance control is control where motor torque Tmot (CRK MOT torque Tcrk and TRC MOT torque Ttrc in the present embodiment) is consecutively added as additional torque to the engine torque Teng.

In instant assistance control, response delay in engine torque Teng includes response delay when starting the engine 32, until the engine torque Teng reaches a target engine torque Teng_tar, for example. Response delay in engine torque Teng also includes delay when shifting up the transmission 38, until the engine torque Teng reaches the target engine torque Teng_tar.

FIG. 3 is a diagram illustrating the relationship between motors operating in motor assist control according to the present embodiment and the AP operation amount θap. In a case of instant assistance control, if the accelerator pedal 102 is on (i.e., if the AP operation amount θap exceeds zero, for example) the CRK MOT 34 operates but the TRC MOT 52a and 52b do not operate, as can be seen from FIG. 3. In a case of consecutive assistance control, if the amount of depression of the accelerator pedal 102 is great (i.e., if the AP operation amount θap is equal to or greater than the operation amount threshold value THθap, for example) the CRK MOT 34 and the TRC MOT 52a and 52b operate.

FIG. 4 is a diagram illustrating the relationship between the AT operation amount θap at high vehicular speed and the torque of each of the drive sources (engine 32 and first through third motors 34, 52a, and 52b) in the engine travelling mode according to the present embodiment. In a case where the AP operation amount θap is below the operation amount threshold value THθap, only the engine 32 is operated, as illustrated in FIG. 4. In a case where the AP operation amount θap is equal to or greater than the operation amount threshold value THθap, the CRK MOT 34 and the TRC MOT 52a and 52b are operated in addition to the engine 32 (consecutive assistance control). Thus, the engine torque Teng and assistance torques Tcrk_asi and Ttrc_asi are generated. In a case where the AP operation amount θap is equal to or greater than the operation amount threshold value THθap, the motor torque Tmot in consecutive assistance control is constant (or is a substantially fixed value) regardless of the AP operation amount θap, as illustrated in FIG. 4 (details will be described later with reference to FIGS. 8, and 12).

A-2-3. Vehicle Power Control in Engine Traveling Mode
A-2-3-1. Overview

FIG. 5 is a flowchart of vehicle power control in the engine traveling mode according to the present embodiment. In step S11, the ECU 28 acquires the AP operation amount θap, vehicular speed V, shift position Ps, and engine rotational speed Ne.

In step S12, the ECU 28 calculates the target total torque Ttotal_tar based on the AP operation amount θap, vehicular speed V, and the shift position Ps. The target total torque Ttotal_tar is the target torque for the entire vehicle 10.

In step S13, the ECU 28 calculates the maximum engine torque Teng_max using the engine rotational speed Ne (details will be described later with reference to FIG. 6).

In step S14, the ECU 28 determines whether or not instant assistance control is necessary. Examples of cases where the ECU 28 determines that instant assistance control is necessary includes the following.

When switching from MOT traveling mode to ENG traveling mode (when starting the engine 32)
When determining that the gear position has been shifted up based on the shift position Ps In a case of having determined that instant assistance control is necessary (YES in S14), in step S15 the ECU 28 executes instant assistance control (details will be described later). In a case of not having determined that instant assistance control is necessary (NO in S14), the flow advances to step S16.

In step S16, the ECU 28 determines whether or not the target total torque Ttotal_tar calculated in step S12 is equal to or smaller than the maximum engine torque Teng_max calculated in step S13. In a case where the target total torque Ttotal_tar is equal to or smaller than the maximum engine torque Teng_max (Yes in S16), the flow advances to step S17.

In step S17, the ECU 28 executes engine torque control. The engine 32 is controlled in engine torque control so that the target total torque Ttotal_tar is the target engine torque Teng_tar. Motor assistance is not performed in step S17.

Returning to step S16, in a case where the target total torque Ttotal_tar is not equal to or smaller than the maximum engine torque Teng_max (No in S16), in step S13 the ECU 28 determines whether or not consecutive assistance control is necessary. For example, the ECU 28 determines whether or not the AP operation amount θap is equal to or greater than the operation amount threshold value THθap. The operation, amount threshold value THθap is a threshold value used to determine whether or not the driver is demanding rapid acceleration. A method of setting the operation amount threshold value THθap will be described later with reference to FIG. 7.

In a case where consecutive assistance control is not necessary (NO in S18), the flow advances to step S17. At this time, the target total torque Ttotal_tar is set for the target engine torque Teng_tar (Teng_tar←Ttotal_tar). In a case where consecutive assistance control is necessary, the flow advances to step S19.

In step S19, the ECU 28 executes engine torque control and consecutive assistance control. Unlike step S17, the engine torque control in step S.1S sets the maximum engine torque Teng_max for the target engine torque Teng_tar. Consecutive assistance control will be described later with reference to FIG. 8 and other drawings.

A-2-3-2. Calculating Maximum Engine Torque Teng_max (S13 in FIG. 5)

Figure 6:
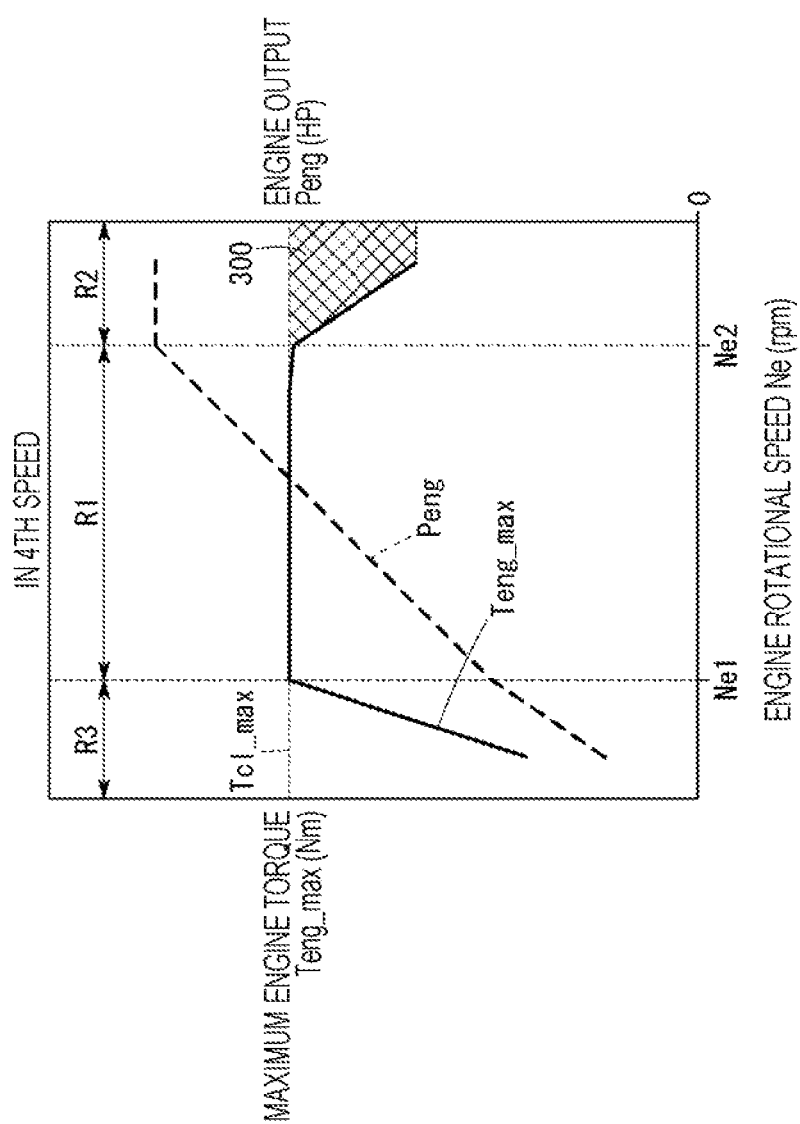
FIG. 6 is a diagram illustrating an example of the relationship between rotational speed of the engine, maximum engine torque, and engine; output according to; the embodiment.

FIG. 6 is an example illustrating the relationship between the engine rotational speed Ne, the maximum engine torque Teng_max, and engine output Peng according to the present embodiment. Tcl_max in FIG. 6 is the maximum transmission, torque; Tcl_max of the clutch 36 (hereinafter also referred to as "maximum clutch transmission torque Tcl_max"). The maximum transmission torque Tcl_max is the maximum value of torque that the clutch 36 is capable of transmitting from the engine 32 and CRK MOT 34 side to the rear wheels 30 side. In other words, the maximum transmission torque Tcl_max is the power transmission capacity of the clutch 36.

In a case where the engine rotational speed Ne is equal to or smaller than Ne1 or is equal to or greater than Ne2, the maximum engine torque Teng_max is equal to or smaller than the maximum transmission torque Tcl_max. On the other hand, in a case where the engine rotational speed Ne is greater than Ne1 and smaller than Ne2, the maximum engine torque Teng_max exceeds the maximum transmission torque Tcl_max. Hereinafter, a region of engine rotational speed Ne exceeding Ne1 and smaller than Ne2 will be referred to as "first Ne region R1". A region of engine rotational speed Ne exceeding Ne2 will be referred to as "second Ne region R2", and a region of engine rotational speed Ne smaller than Ne1 will be referred to as "third Ne region R3".

In a case where the maximum engine torque Teng_max is equal to or greater than the maximum clutch transmission torque Tcl_max, even if CRK MOT torque Tcrk is generated, the sum of the maximum engine torque Teng_max and CRK MOT torque Tcrk will exceed the maximum clutch transmission torque Tcl_max. In this case, the clutch will slip due to the amount exceeding the maximum clutch transmission torque Tcl_max, so generating the CRK MOT torque Tcrk is not effective. Accordingly, the ECU 28 does not generate CRK MOT torque Tcrk in a case where the engine rotational speed Ne is equal to or greater than Ne1 and is equal to or smaller than Ne2 in the present embodiment.

In a case where the engine rotational speed Ne is smaller than Ne1 in the present embodiment, the target total torque Ttotal_tar for the vehicle 10 can be achieved by the maximum engine torque Teng_max alone. Accordingly, in a case where the engine rotational speed Ne is smaller than Ne1, the ECU 28 does not generate CRK MOT torque Tcrk. Note however, that even if the engine rotational speed Ne is smaller than Ne1, in a case where the maximum engine torque Teng_max alone cannot achieve the target total torque Ttotal_tar, or so forth, the ECU 28 may generate CRK MOT torque Tcrk.

In a case where the engine rotational speed Ne is greater than Ne2 in the present embodiment, the target total torque Ttotal_tar for the vehicle 10 cannot be achieved by the maximum engine torque Teng_max alone (due to the specifications of the engine 32 and clutch 36). In this case where the engine rotational speed Ne is greater than Ne2, the ECU 28 generates CRK MOT torque Tcrk.

A-2-3-3. Instant Assistance Control

As described above, instant assistance control is control where, when running the engine 32, response delay in engine torque Teng is instantaneously supplemented by motor torque Tmot (particularly CRK MOT torque Tcrk). Instant assistance control is used when switching from MOT traveling mode to ENG travelling mode (when starting the engine 32) or when shifting the transmission 38 up, for example.

In a case of starting the engine 32, the following procedures are carried out until the engine torque Teng reaches the target value (target total torque Ttotal_tar or the like). First, the CRK MOT 34 rotates the crankshaft (omitted from illustration) before ignition to increase the engine rotational speed Ne. Ignition is performed at the engine 32 when the ignition timing arrives. After ignition, the engine rotational speed Ne (engine torque Teng) is increased. The engine torque Teng reaches the target value (target total torque Ttotal_tar or the like).

Such procedures take more time as compared with a case where the CRK MOT 34 generates torque Tcrk. Accordingly, after starting the engine 32, the ECU 28 causes the CRK MOT 34 to generate assistance torque Tcrk_asi until the engine torque Teng reaches the target value, thereby instantaneously supplementing response delay in engine torque Teng.

When shifting the transmission 38 up, the engine torque Teng temporarily drops. Accordingly, after shifting up, the ECU 28 causes the CRK MOT 34 to generate assistance torque Tcrk_asi until the engine torque Teng reaches the target value, thereby instantaneously supplementing response delay in engine torque Teng.

Note that the maximum value of the assistance torque Tcrk_asi in instant assistance control may foe calculated based on the discharge limit value Pbat_lim of the battery 60 and TRC MOT output limit torque Ttrc_lim (details will be described along with description of consecutive assistance control).

A-2-3-4. Operation Amount Threshold Value TH$\theta$ap

The operation amount threshold value TH$\theta$ap is a threshold value for the AP operation amount $\theta$ap used for motor assist (or hybrid mode) determination in the present embodiment, as described above. The operation amount threshold value TH$\theta$ap is set taking into consideration the AP operation amount $\theta$ap when the kick-down switch 32 goes on (hereinafter referred to as "kick-down threshold value TH$\theta$kd" or "KD threshold value TH$\theta$k"), which will be described below in detail.

Figure 7:
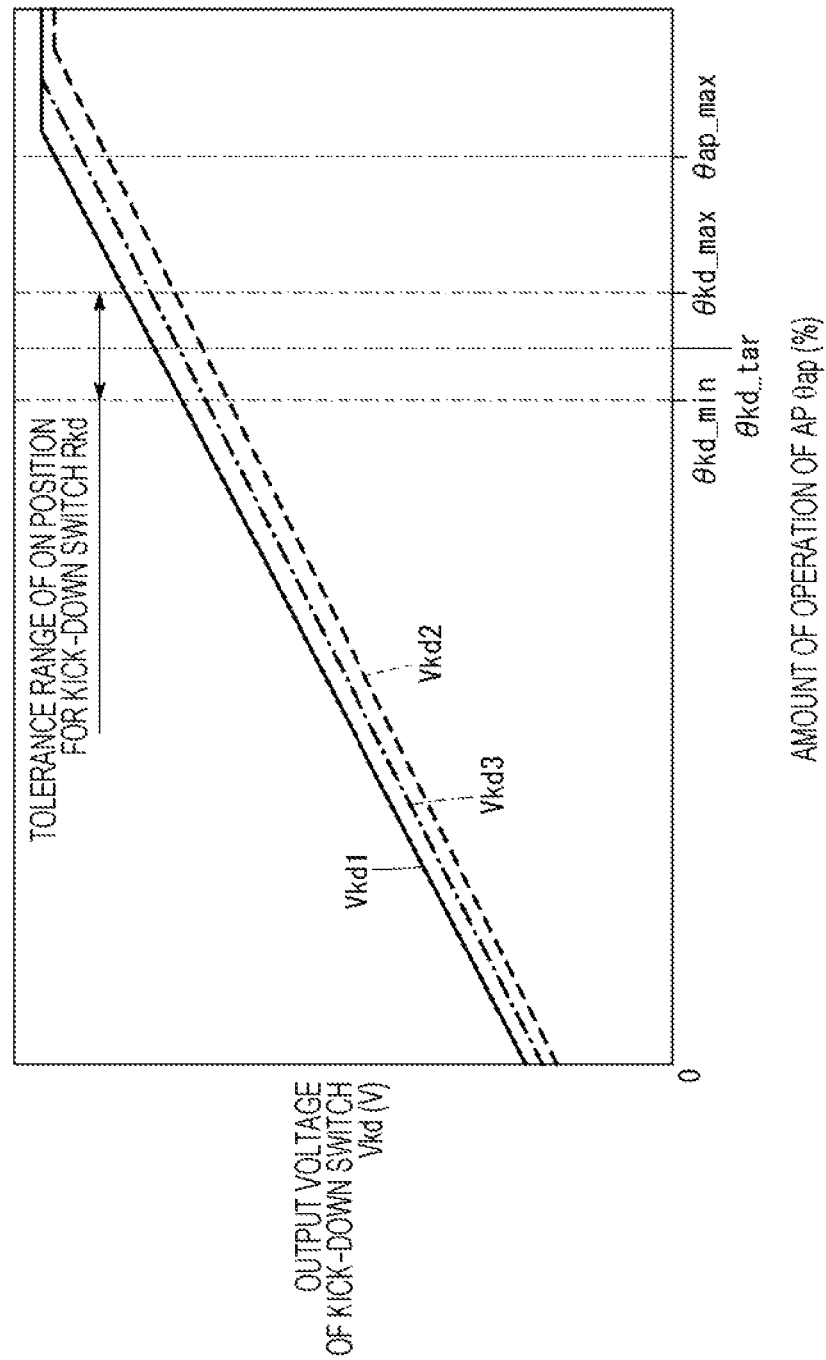
FIG. 7 is a diagram illustrating an example of the relationship between a kick-down threshold value where a kick-down switch turns on, and output voltage of the kick-down switch.

FIG. 7 is a diagram illustrating an example of the relationship between the kick-down threshold value TH$\theta$kd where the kick-down switch 92 goes on and output voltage Vkd of the kick-down switch 92 according to the present embodiment. In FIG. 7, the horizontal axis is the AP operation amount $\theta$ap, and the vertical axis is the output voltage Vkd of the kick-down switch 92.

FIG. 7 illustrates three types of output voltage Vkd (i.e., output voltage Vkd1, Vkd2, and Vkd3). Property Vkd1 is a property where the output voltage Vkd is the highest, at the same AP operation amount $\theta$ap, property Vkd2 is a property where the output voltage Vkd is the lowest at the same AP operation amount $\theta$ap, and property Vkd3 is a property where the output, voltage Vkd is average at the same AP operation amount $\theta$ap.

$\theta$ap_max in FIG. 7 is the maximum value of the AP operation amount $\theta$ap. At the maximum value 74 ap_max, the accelerator pedal 102 comes into contact with a stopper that is omitted from illustration, and can be depressed no more.

Rkd indicates a tolerance range for setting the kick-down threshold value TH$\theta$kd. That is to say, vehicles 10 of the same type are designed so that the AP operation amount $\theta$ap where the kick-down switch 92 goes on (KD threshold value TH$\theta$kd) falls within the tolerance range Rkd. The tolerance range Rkd is stipulated by minimum tolerance value $\theta$kd_min and maximum tolerance value $\theta$kd_max. For example, the tolerance range Rkd is set to any value ±5 to 10% of the design target value $\theta$kd_tar for the KD threshold value TH$\theta$kd. The design target value, $\theta$kd_tar is designed so that the output voltage Vkd of the kick-down switch 92 is in the range of Vkd1 to Vkd2 at any value 75 to 90% of the maximum value $\theta$ap_max.

In the present embodiment, the minimum, tolerance value $\theta$kd_min or a nearby value (e.g., any value included in minimum tolerance value $\theta$kd_min ±1.00%) is set as the operation amount threshold value TH$\theta$ap. Accordingly, consecutive assistance control (S19 in FIG. 5, and later described FIG. 8) is started before the kick-down switch 92 turns on, in the greater part of or all vehicles 10.

A-2-3-5. Consecutive Assistance Control
A-2-3-5-1. Overview

Figure 8:
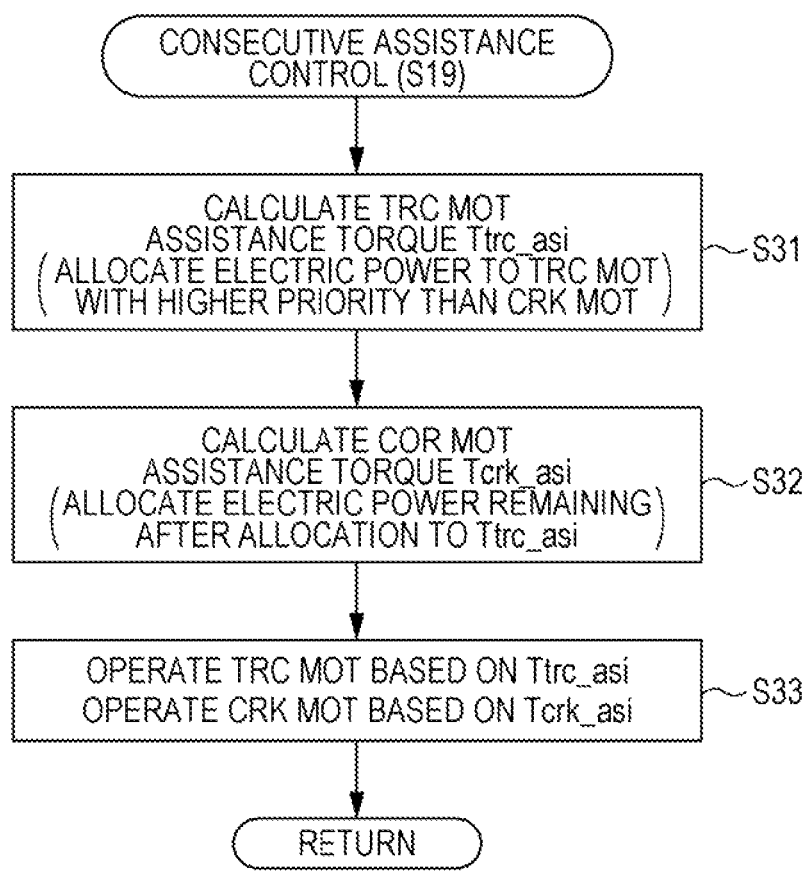
FIG. 8 is a flowchart of consecutive assistance control according to the embodiment.

FIG. 8 is a flowchart of consecutive assistance control according to the present embodiment. In step S31, the ECU 28 calculates TRC MOT assistance torque Ttrc_asi so that electric power is allocated to the TRC MOT 52a and 52b with priority over the CRK MOT 34 (details will be described later with reference to FIG. 9).

In step S32, the ECU 28 calculates CRK MOT assistance torque Tcrk_asi so that electric power remaining after allocating to TRC MOT assistance torque Ttrc_asi is allocated to the CRK MOT 34 (details will be described later with reference to FIG. 12).

In step S33, the ECU 28 operates the TRC MOT 52a and 52b based on the TRC MOT assistance torque Ttrc_asi, and also operates the CRK MOT 34 based on the CRK MOT assistance torque Tcrk_asi.

A-2-3-5-2. Calculating MOT Assistance Torque Ttrc_asi
A-2-3-5-2-1. Overview

FIG. 3 is a block diagram describing calculation of the MOT assistance torque Ttrc_asi in the consecutive assistance control according to the present embodiment. When calculating the MOT assistance torque Ttrc_asi, the ECU 28 allocates electric power to the TRC MOT 52a and 52b with priority over the CRK MOT 34, as described above. The ECU 28 includes a BAT discharge limit value calculating unit 200, an electric power-to-torque conversion unit 202, a TRC MOT output limit torque calculating unit 204, and a TRC MOT assistance torque calculating unit 206 as illustrated in FIG.

A-2-3-5-2-2. BAT Discharge Limit Value Calculating Unit 200

The BAT discharge limit value calculating unit 200 (hereinafter also referred to as "discharge limit value calculating unit 200") calculates the discharge limit value Pbat_lim of the battery 60, based on the temperature Hbat, SOC, and current Ibat of the battery 60.

Figure 10:
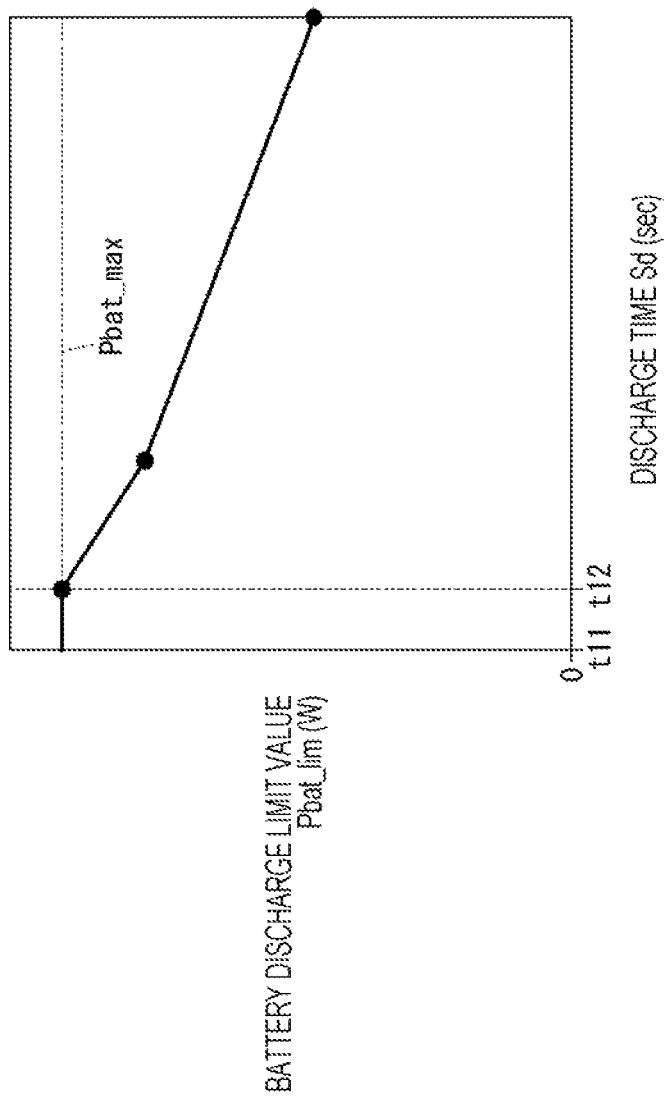
FIG. 10 is a diagram illustrating an example of the relationship between battery discharge time and discharge limit value according to the embodiment.

FIG. 10 is a diagram illustrating an example of the relationship between discharge time Sd of the battery 60 and the discharge limit value Pbat_lim in the present embodiment. The horizontal axis in FIG. 10 is the discharge time Sd (in seconds) of the battery 60, and the vertical axis is the discharge limit value Pbat_lim (W). Note that FIG. 10 represents values in a case where the battery temperature Hbat and SOC are predetermined values (fixed values), and the battery power Pbat changes along the discharge limit value Pbat_lim. The discharge limit value Pbat_lim is generally constant at the maximum discharge value Pbat_max from time t11 to time t12, but the discharge limit value Pbat_lim continues to drop after time t12.

In the present embodiment, the discharge limit value Pbat_lim is stored in the storage unit 114 for each battery temperature Hbat, SOC, and discharge time Sd. Accordingly, the ECU 28 can calculate a discharge limit value Pbat_lim corresponding to the combination of the battery temperature Hbat, SOC, and discharge time Sd.

A-2-3-5-2-3. Electric Power-to-Torque Conversion Unit 202

The electric power-to-torque conversion unit 202 uses logical values or simulation values to calculate torque (discharge limit torque Tbat_lim) in terms of Nm, corresponding to the discharge limit value Pbat_lim (W).

A-2-3-5-2-4. TRC MOT Output Limit Torque Calculating Unit 204

The TRC MOT output limit torque calculating unit 204 (hereinafter also "first limit torque calculating unit 204") calculates the TRC MOT output limit torque Ttrc_lim (hereinafter also "first limit torque Ttrc_lim") based on the vehicular speed V.

Figure 11:
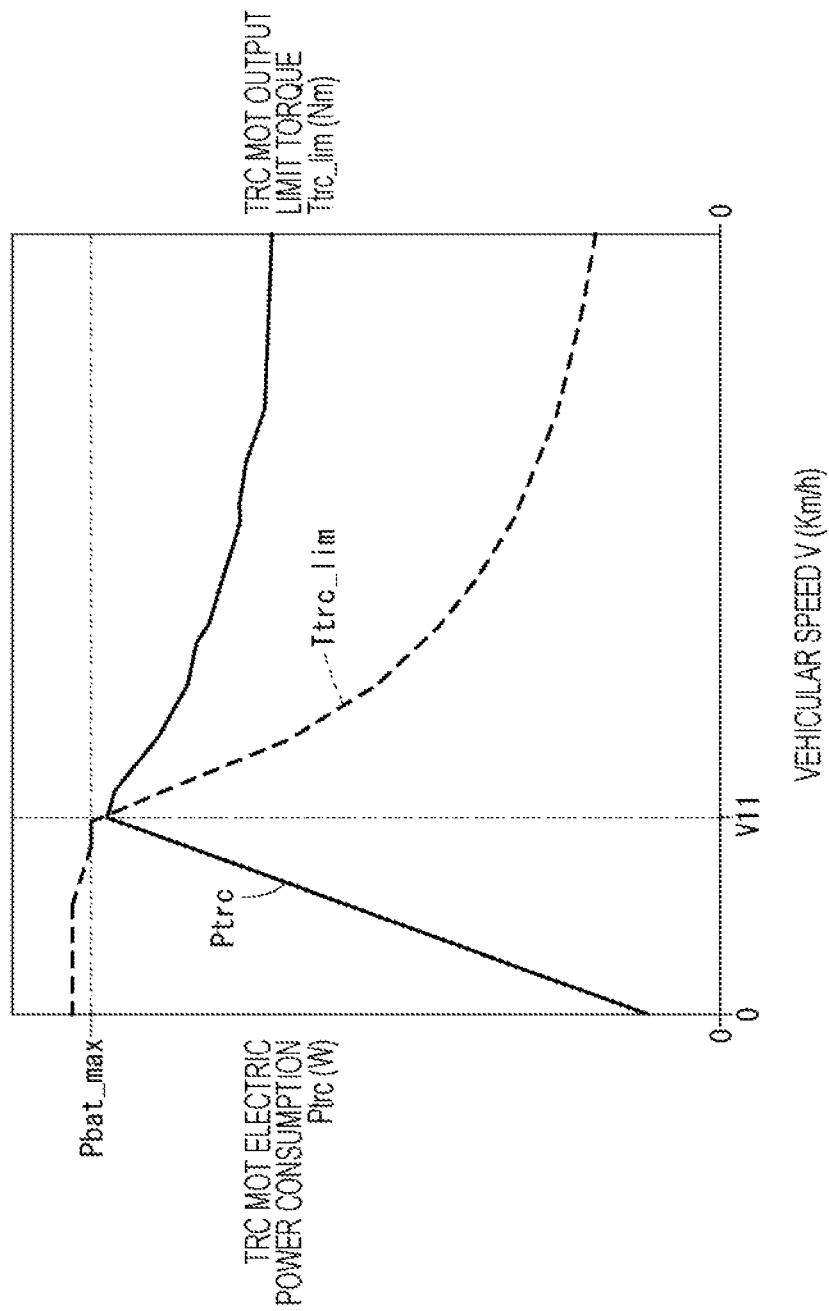
FIG. 11 is a diagram illustrating an example of the relationship between vehicular speed, power consumption of a traction motor, and output limit torque of the traction motor, according to the embodiment.

FIG. 11 is a diagram illustrating an example of the relationship between the vehicular speed V, electric power consumption Ptrc of TRC MOT 52a and 52b, and TRC MOT output limit torque Ttrc_lim (first limit, torque Ttrc_lim) according to the present, embodiment. The horizontal axis in FIG. 11 represents the vehicular speed V (km/h) and the vertical axis represents the electric power consumption Ptrc and first limit torque Ttrc_lim. From vehicular speed V zero through V11, the electric power consumption Ptrc increases and the first limit torque Ttrc_lira gradually declines. As the vehicular speed V approaches V11, the first limit torque Ttrc_lim reaches the maximum value, and the electric power consumption Ptrc of the TRC MOT 52a and 52b approaches the maximum discharge value Pbat_max of the battery 60 (the same as in FIG. 10).

When the vehicular speed V exceeds V11, the electric power consumption Ptrc and first limit torque Ttrc_lim decrease. Accordingly, a deviation occurs between the maximum discharge value Pbat_max and the electric power consumption Ptrc (i.e., an excess electric power value). This excess electric power is used to operate the CRK MOT 34 in the present embodiment (details will be described later). Accordingly, the., first limit torque calculating unit 204 can calculate the first limit torque Ttrc_lim based on the vehicular speed V.

Note that in the present embodiment, the revolutions (rotational speed) of the TRC MOT 52a and 52b per time unit (rad/sec) and the vehicular speed V are in a correlative relationship. Accordingly, the first limit torque Ttrc_lim may be calculated based on the rotational speed of the CRK MOT 34 detected by a TRC MOT rotational speed sensor that is omitted from illustration.

A-2-3-5-2-5. TRC MOT Assistance Torque Calculating Unit 206

The TRC MOT assistance torque calculating unit 206 (hereinafter also "first assistance torque calculating unit 206") calculates the smaller of the discharge limit torque Tbat_lim from the electric power-to-torque conversion unit 202, and the first limit torque Ttrc_lim from the first limit torque calculating unit 204, as TRC MOT assistance torque Ttrc_asi. It can be seen from the above description that the TRC MOT assistance torque Ttrc_asi is calculated based on the BAT discharge limit value Pbat_lim and the TRC MOT output limit torque Ttrc_lim. It should thus be noted that in a state where the AP operation amount θap exceeds the operation amount threshold value THθap, the TRC MOT assistance torque Ttrc_asi is independent from the AP operation amount θap (in other words, even if the AP operation amount θap changes, the TRC MOT assistance torque Ttrc_asi is not directly changed).

A-2-3-5-3. Calculating TRC MOT Assistance Torque Tcrk_asi

A-2-3-5-3-1. Overview

Figure 12:
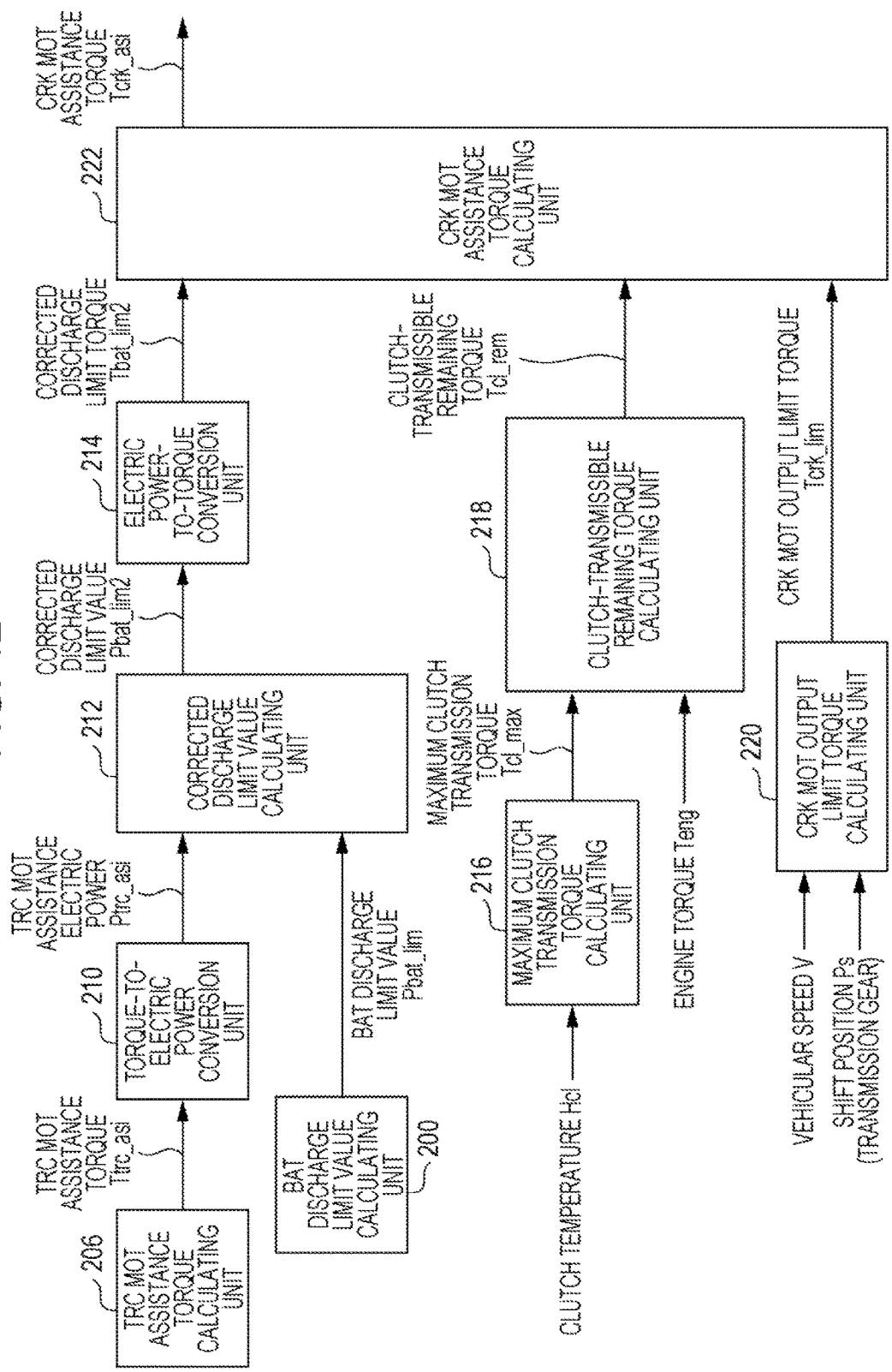
FIG. 12 is a block diagram for describing calculation of crank motor assistance torque in the consecutive assistance control according to the embodiment.

FIG. 12 is a block diagram for describing calculation of CRK MOT assistance torque Tcrk_asi. When calculating the CRK MOT assistance torque Tcrk_asi, the ECU 28 allocates electric power that remains after allocation to the TRC MOT assistance torque Ttrc_asi, to the CRK MOT 34, as described above.

In addition to the above-described BAT discharge limit value calculating unit 200 and TRC MOT assistance torque calculating unit 206, the ECU 28 further includes a torque-to-electric power conversion unit 210, a corrected discharge limit value calculating unit 212, an electric power-to-torque conversion unit 214, a maximum clutch transmission torque calculating unit 216, a clutch-transmissible remaining torque calculating unit 218, a CRK MOT output limit torque calculating unit 220, and a CRK MOT assistance torque calculating unit 222, as illustrated in FIG. 12.

A-2-3-5-3-2. Torque-to-Electric Power Conversion Unit 210

The torque-to-electric power conversion unit 210 calculates electric power (TRC MOT assistance electric power Ptrc_asi) that corresponds to the TRC MOT assistance torque Ttrc_asi calculated by the TRC MOT assistance torque calculating unit 206. Logical values or simulation values are used for this calculation.

A-2-3-5-3-3. Corrected Discharge Limit Value Calculating Unit 212

The corrected discharge limit value calculating unit 212 calculates deviation between the discharge limit value Pbat_lim calculated by the BAT discharge limit value calculating unit 200 and the TRC MOT assistance electric power Ptrc_asi calculated by the torque-to-electric power conversion unit 210, as corrected discharge limit value Pbat_lim2 (Pbat_lim2=Pbat_lim−Ptrc_asi).

A-2-3-5-3-4. Electric Power-to-Torque Conversion Unit 214

The electric power-to-torque conversion unit 214 calculates torque (corrected discharge limit torque Tbat_lim2) corresponding to the corrected discharge limit value Pbat_lim2.

A-2-3-5-3-5. Maximum Clutch Transmission Torque Calculating Unit 216

The maximum clutch transmission torque calculating unit 216 calculates the maximum clutch transmission torque Tcl_max based on the clutch temperature Hcl. The maximum transmission torque Tcl_max is the maximum value of torque that the clutch 36 is capable of transmitting from the engine 32 and CRK MOT 34 side to the rear wheels 30 side, as described earlier with reference to FIG. 6. In other words, the maximum transmission torque Tcl_max is the power transmission capacity of the clutch 36.

When the clutch temperature Hcl increases, the maximum clutch transmission torque Tcl_max decreases. Accordingly, the relationship between the clutch temperature Hcl and the maximum clutch transmission torque Tcl_max is stored in the storage unit 114 as a map. The ECU 28 calculates the maximum clutch transmission torque Tcl_max based on the clutch temperature Hcl. Note that the maximum clutch transmission torque Tcl_max may be set as a fixed value without using the clutch temperature Hcl.

A-2-3-5-3-6. Clutch-Transmissible Remaining Torque Calculating Unit 218

The clutch-transmissible remaining torque calculating unit 218 calculates the deviation between the maximum clutch transmission torque Tcl_max and the engine torque Teng as clutch-transmissible remaining torque Tcl_rem.

A-2-3-5-3-7. CRK MOT Output Limit Torque Calculating Unit 220

The CRK MOT output, limit torque calculating unit. 220 (hereinafter also referred to as "second limit torque calculating unit 220") calculates CRK MOT output limit torque Tcrk_lim (hereinafter also "second limit torque Tcrk_lim") based on the vehicular speed V and shift position Ps (transmission gear).

Specifically, the second limit torque Tcrk_lim is dependent on the vehicular speed V and shift position Ps (transmission gear). Accordingly, the ECU 28 calculates the second limit torque Tcrk_lim based on the vehicular speed V and the shift position Ps (transmission gear). Note however, that if the effect of the transmission gear is miniscule, the ECU 28 may calculate the second limit torque Tcrk_lim based on the vehicular speed V alone. Alternatively, the second limit torque Tcrk_lim may be calculated based on the revolutions (rotational speed) of the CRK MOT 34 per time unit (rad/sec), detected by a CRK MOT rotational speed sensor that is omitted from illustration.

A-2-3-5-3-8. CRK MOT Assistance Torque Calculating Unit 222

The CRK MOT assistance torque calculating unit 222 (hereinafter also "second assistance torque calculating unit 222") calculates the smallest of the corrected discharge limit torque Tbat_lim2, the clutch-transmissible remaining torque Tcl_rem, and the second limit torque Tcrk_lim, as CRK MOT assistance torque Tcrk_asi.

As described above, the corrected discharge limit torque Tbat_lim2 corresponds to the corrected discharge limit, value Pbat_lim2 that is the deviation between the discharge limit value Pbat_lim and the TRC MOT assistance electric power Ptrc_asi. Accordingly, the electric power remaining after allocation to the TRC MOT assistance torque Ttrc_asi is allocated to the CRK MOT 34.

Accordingly, the second limit torque calculating unit 220 can calculate the second limit torque Tcrk_lim. Note that the second limit torque calculating unit 220 may restrict the amount of change of the second limit torque Tcrk_lim per time unit, to prevent the change of the second limit torque Tcrk_lim from becoming too great.

It can be seen from the above that the CRK MOT assistance torque Tcrk_asi is calculated from the BAT discharge limit value Pbat_lim, the TRC MOT output limit torque Ttrc_lim, and the CRK MOT output limit torque Tcrk_lim. Accordingly, in a state where the AP operation amount θap exceeds the operation amount threshold value THθap, the CRK MOT assistance torque Tcrk_asi is independent from the AP operation amount θap (in other words, even if the AP operation amount θap changes, the CRK MOT assistance torque Tcrk_asi is not directly changed).

A-2-3-5-4. Specific Timing Chart

A-2-3-5-4-1. First Specific Example: Consecutive Assistance Control of TRC MOT 52a and 52b FIG. 13A is a diagram illustrating a first example of temporal change of the AP operation amount θap according to the present embodiment. The AP operation amount θap is constant from time t21 to time t.22 in FIG. 13A. The AP operation amount θap increases from time t22, and reaches the operation amount threshold value THθap at time t23. The AP operation amount θap further increases thereafter, and reaches the maximum value θap_max at time t24. The AP operation amount θap is then constant after time t24 at the maximum value θap_max.

FIG. 13B is a diagram illustrating an example of the target total torque Ttotal_tar, target engine torque Teng_tar, and TRC MOT assistance torque Ttrc_asi, corresponding to the AP operation amount θap in FIG. 13A. FIG. 13C is a diagram illustrating an example of transmission gears corresponding to FIGS. 13A and 13B.

The AP operation amount θap is constant from time t21 to t22, so the target total torque Ttotal_tar and target engine torque Teng_tar are constant. As the AP operation amount θap increases from time t22, the target total torque Ttotal_tar and target engine torque Teng_tar also increase.

At time t23, the AP operation amount θap reaches the operation amount threshold value THθap (YES in S18 in FIG. 5). Accordingly, the ECU 28 starts consecutive assistance control by the TRC MOT 52a and 52b (S19).

Although FIGS. 13A through 13C do not illustrate consecutive assistance control by the CRK MOT 34, the CRK MOT 34 also outputs assistance torque Tcrk_asi. The assistance torque of the CRK MOT 34 will be described later with reference to FIGS. 14A through 14C. In consecutive assistance control, the ECU 23 increases the TRC MOT assistance torque Ttrc_asi from time t23.

The ECU 28 shifts up the transmission 38 from time t25 to t26. Third gear is shifted up to fourth gear here. The target engine torque Teng tar temporarily drops due to this upshifting. The assistance torque of the CRK MOT 34 basically does not change at this time. Upon the upshifting being completed at time t26, the target total torque Ttotal_tar and target engine torque Teng_tar gradually increase.

A-2-3-5-4-2. Specific Example 2: Consecutive Assistance Control of CRK MOT 34

Figure 14A:
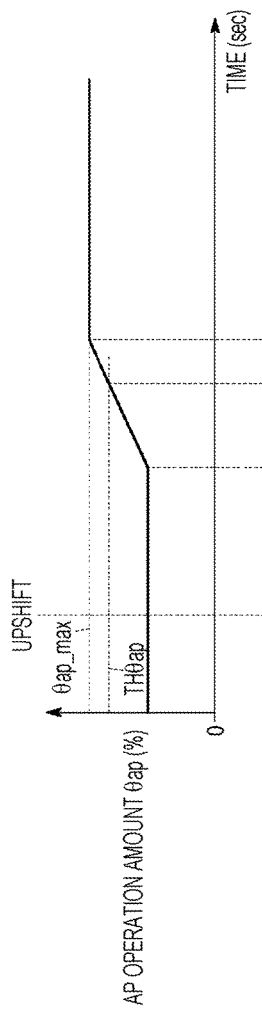
FIG. 14A is a diagram illustrating an example of temporal change in the accelerator pedal operation amount according to the embodiment.

FIG. 14A is a diagram illustrating an example of temporal change of the AP operation amount θap according to the present embodiment. The AP operation amount θap is constant from time t31 to time t33 in FIG. 14A. The AP operation amount θap increases from time t33, and reaches the operation amount threshold value THθap at time t35. The AP operation amount θap further increases thereafter, and reaches the maximum value θap_max at time t36. The AP operation amount θap is then constant after time t36 at the maximum value θap_max.

Figure 14B:
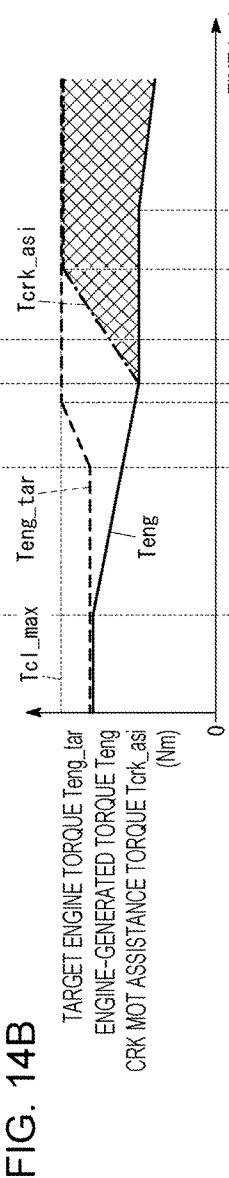
FIG. 14B is a diagram illustrating an example of the target engine torque corresponding to the accelerator pedal operation amount in FIG. 14A, generated engine torque, and crank motor assistance torque.
Figure 14C:
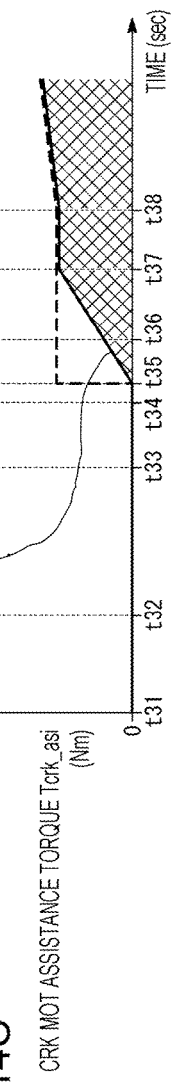
FIG. 14C is a diagram illustrating an example of the crank motor assistance torque corresponding to the accelerator pedal operation amount in FIG. 14A.

FIG. 14B is a diagram illustrating an example of the target engine torque Teng tear, engine-generated torque Teng, and CRK MOT assistance torque Tcrk_asi, corresponding to the AP operation amount θap in FIG. 14A. FIG. 14C is a diagram illustrating CRK MOT assistance torque Tcrk_asi corresponding to the AP operation amount θap in FIG. 14A.

The AP operation amount θap is constant from time t31 to t33, but the engine-generated torque Teng drops from time t32. This is because the engine rotational speed Ne has increased and is equal to or greater than Ne2 (see FIG. 6). On the other hand, target engine torque Teng_tar is calculated in accordance with the AP operation amount θap, and accordingly is constant from time t31 to t33. Accordingly, a difference (discrepancy) occurs between the target engine torque Teng_tar and engine-generated torque Teng (see t32 to t33 in FIG. 14B).

Now, the difference (discrepancy) between the target engine torque Teng_tar and engine-generated torque Teng may be assisted (or supplemented) by the CRK MOT 34 or the TRC MOT 52a and 52b. However, assistance (or supplementation) by the CRK MOT 34 or TRC. MOT 52a and 52b is not performed in the present, embodiment, unless the AP operation amount θap exceeds the operation amount threshold value THθap (see S18 in FIG. 5). Accordingly, the difference between the target engine torque Teng_tar and engine-generated torque Teng is left as it is.

As the AP operation amount θap increases from time t33, the target engine torque Teng_tar also increases. On the other hand, the engine rotational speed Ne continues to increase, so the engine torque Teng continues to drop.

At time t34, the target engine torque Teng_tar reaches the maximum clutch transmission torque Tcl_max. Accordingly, after time t34, the target engine torque Teng_tar is constant even if the AP operation amount θap increases.

At time t35, the AP operation amount θap reaches the operation amount threshold value THθap (YES in S18 in FIG. 5). Accordingly, the ECU 28 starts consecutive assistance control by the CRK MOT 34 (S19). Note that the region 300 in FIG. 6 is the region where the CRK MOT assistance torque Tcrk_asi can be generated.

Although consecutive assistance control by the TRC MOT 52a and 52b is not illustrated in FIGS. 14A through 14C, the TRC MOT 52a and 52b also output assistance torque Ttrc_asi. Note however, that the ECU 28 generates TRC MOT assistance torque Ttrc:_asi independently from the AP operation amount θap (or the target engine torque Teng_tar corresponding thereto). In other words, the TRC MOT assistance torque Ttrc_asi is output as a value that is close to being a fixed value. Accordingly, the TRC MOT assistance torque Ttrc_asi is generated independently from the target engine torque Teng_tar.

The ECU 28 gradually increases the CRK MOT assistance torque Tcrk_asi from time t35 in order to perform assistance (or to supplement) regarding the difference (discrepancy) between the target engine torque Teng_tar (i.e., the maximum transmission torque Tcl_max) and engine-generated torque Teng. The reason is that changing the assistance torque Tcrk_asi as indicated by the dashed line in FIG. 14C would result in the change in overall torque Ttotal being too abrupt.

At time t37, the sum of the engine-generated torque Teng and the CRK MOT assistance torque Tcrk_asi becomes equal to the target engine torque Teng_tar. Thereafter, when the engine-generated torque Teng further drops from time t38, the CRK MOT assistance torque Tcrk_asi increases in conjunction with this.

A-2-3-5-5. Application to Instant Assistance Control

The method of calculating the CRK MOT assistance torque Tcrk_asi described in consecutive assistance control can also be applied to instant assistance control as well. That is to say, the maximum value of the assistance torque Tcrk_asi can be calculated as the discharge limit value Pbat_lim of the battery 60 and TRC MOT output limit torque Ttrc_lim. The ECU 28 then restricts the CRK MOT assistance torque Tcrk_asi for instantaneous supplementation for response delay in engine torque Teng by CRK MOT torque Tcrk to be no greater than this maximum value.

Also, in the case of instant assistance control, the CRK MOT assistance torque Tcrk_asi is generated with higher priority over the TRC MOT output limit torque Ttrc_lim. Accordingly, the TRC MOT output limit torque Ttrc lira can be calculated after having first calculated the CRK MOT assistance torque Tcrk_asi. Note that the instant assistance control may be performed using only the CRK MOT assistance torque Tcrk_asi.

A-3. Advantages of Present Embodiment

Figure 9:
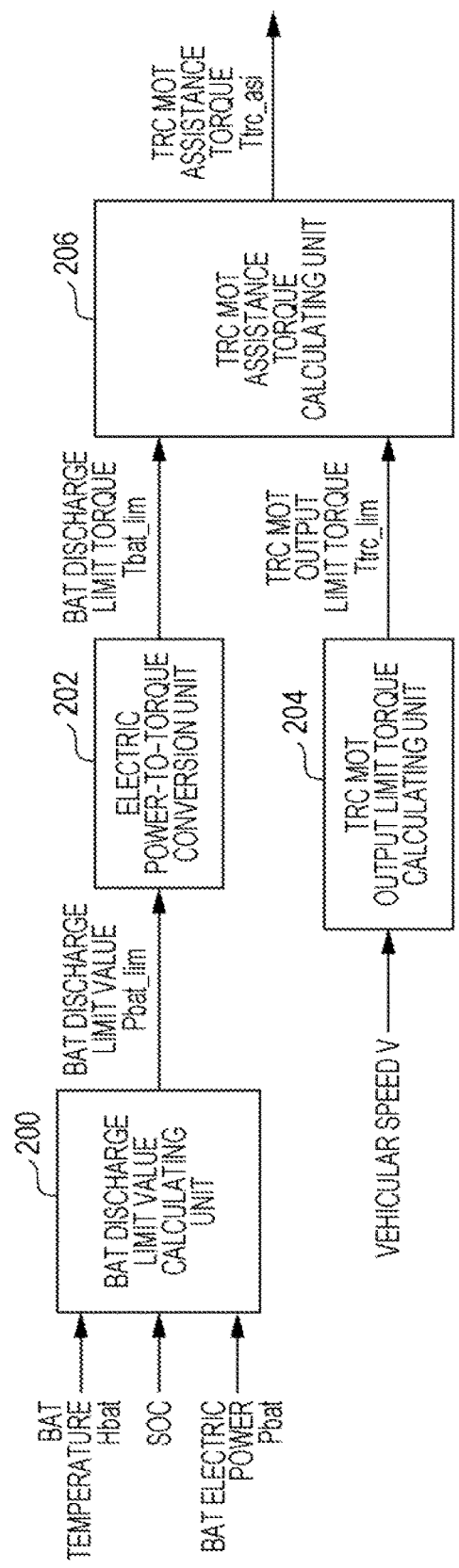
FIG. 9 is a block diagram for describing calculation of traction motor assistance torque in the consecutive assistance control according to the embodiment.

According to the present embodiment as described above, when adding assistance torque Tmot_asi (additional power) to the engine torque Teng (power of the internal combustion engine) (NO in S16 in FIG. 5), electric power is allocated to the TRC MOT 52a and 52b (second rotating electrical machines) with priority over the CRK MOT 34 (first rotating electrical machine), thereby generating TRC MOT assistance torque Ttrc_asi with priority over CRK MOT assistance torque Tcrk_asi (FIGS. 8, 9, and 12). Accordingly, even in a case where there is a possibility that the sum of the engine torque Teng and the assistance torque Tmot_asi will exceed the maximum clutch transmission torque Tcl_max (the power transmission capacity of the clutch 36), the power of the TRC MOT 52a and 52b (rotating electrical machines connected to the front wheels 50 (second, wheels) without going through the clutch 36) is generated with higher priority, so the total torque Ttotal can be increased in a stable manner (e.g., rapid acceleration). In a case of allocating electric power to the CRK MOT 34 in addition to the TRC MOT 52a and 52b, assistance torque Tmot_asi is generated at both the CRK MOT 34 and the TRC MOT 52a and 52b, thereby generating a relatively great total torque Ttotal.

In the present embodiment, the ECU 28 (power control device) calculates TRC MOT assistance torque Ttrc_asi in accordance with the discharge limit value Pbat_lim of the battery 60 and the output limit torque Ttrc_lim of the TRC MOT 52a and 52b (FIG. 9). The ECU 28 also calculates the CRK MOT 34 assistance torque Tcrk_asi in accordance with the corrected discharge limit value Pbat_lim2 reflecting the TRC MOT assistance torque Ttrc_asi, and the output, limit torque Ttrc_lim of the CRK MOT 34 (FIG. 12).

Accordingly, the TRC MOT assistance torque Ttrc_asi can be maximized within a range permitted by the BAT discharge limit value Pbat_lim and the TRC MOT output limit, torque Ttrc_lim. Additionally, the CRK MOT assistance torque Tcrk_asi can be maximized within a range permitted by the corrected discharge limit value Pbat_lim2 reflecting the TRC MOT assistance torque Ttrc_asi, and the CRK MOT output limit torque Tcrk_lim. Thus, the total torque Ttotal can be maximized.

When the AP operation amount θap exceeds the operation amount threshold value THθap (YES in S18 in FIG. 5) and also assistance torque Tmot_asi is to be added to the engine torque Teng (NO in S16), the ECU 28 (power control device) calculates the TRC MOT assistance torque Ttrc_asi in accordance with the BAT discharge limit value Pbat_lim and the TRC MOT output limit torque Ttrc_lim (FIG. 9) in the present embodiment. The ECU 28 also calculates the CRK MOT assistance torque Tcrk_asi in accordance with the corrected discharge limit value Pbat_lim2 reflecting the TRC MOT assistance torque Ttrc_asi, and the CRK MOT output limit torque Tcrk_lim.

Accordingly, in a case where the driver has an intent of acceleration, or in a case wherein the driver's intent of acceleration is strong, the TRC MOT assistance torque Ttrc_asi can be maximized within a range permitted by the BAT discharge limit value Pbat_lim (power rating) and the TRC MOT output limit torque Ttrc_lim. Additionally, the CRK MOT assistance torque Tcrk_asi can be maximized within a range permitted by the BAT discharge limit value Pbat_lim taking TRC MOT output limit torque Ttrc_lim into consideration, and the CRK MOT assistance torque Tcrk_asi. Thus, even in a case where there is a possibility that the sum of the engine torque Teng and the assistance torque Tmot_asi will exceed the maximum clutch transmission torque Tcl_max, TRC MOT torque Ttrc is generated with higher priority, so the total power can be maximized while increasing the total torque Ttotal in a stable manner (e.g., rapid acceleration).

When the AP operation amount θap exceeds the operation amount threshold value THθap (YES in S18 in FIG. 5) and also assistance torque Tmot_asi is to be added to the engine torque Teng (NO in S16), the ECU 28 (power control device) generates TRC MOT assistance torque Ttrc_asi with higher priority over CRK MOT assistance torque Tcrk_asi (S31 in FIG. 8). Further, when instant assistance control is necessary (YES in S14 in FIG. 5), in other words, when the AP operation amount θap is below the operation amount threshold value THθap and assistance torque Tmot_asi is to be added to the engine torque Teng, the ECU 28 generates CRK MOT assistance torque Tcrk_asi with higher priority over TRC MOT assistance torque Ttrc_asi.

Accordingly, in a case where the AP operation amount θap is below the operation amount threshold value THθap (NO in S18 in FIG. 5), in other words, in a case where there is no intent to accelerate by the driver or the intent to accelerate by the driver is weak, the CRK MOT 34 assistance torque Tcrk_asi connected to the rear wheels 30 via the clutch 36 (i.e., at the same side as the engine 32) is used. Thus, acceleration with consistency can be realized at the same rear wheels 30.

When the AP operation amount θap exceeds the operation amount threshold value THθap (YES in S18 in FIG. 5), that is to say, in a case where the driver has an intent of acceleration, or in a case wherein the intent of acceleration by the driver is strong, the TRC MOT assistance torque Ttrc_asi connected to the front wheels 50 without going through the clutch 36 (i.e., at the side different from the engine 32) is used. Accordingly, even in a case where there is a possibility that the sum of the engine torque Teng and the assistance torque Tmot_asi will exceed the maximum clutch transmission torque Tcl_max, total torque Ttotal can be increased in a stable manner.

The vehicle 10 according to the present embodiment has the kick-down switch 92 for performing kick-down, where the transmission 38 is shifted down when a predetermined depressing operation is performed at the accelerator pedal 102 (FIG. 2). The ECU 28 (power control device) also sets the operation amount threshold value THθap to the kick-down threshold value THθkd that is the AP operation amount θap where the kick-down switch 92 turns on (FIG. 7) or a value reflecting a tolerance value in the kick-down threshold value THθkd.

Accordingly, which of the CRK MOT 34 and the TRC MOT 52a and 52b is to be given priority is determined in accordance with whether or not there is rapid, acceleration accompanying kick-down (i.e., in accordance with intent to accelerate by the driver). Thus, assistance torque Tmot_asi can be generated in accordance with the intent to accelerate by the driver.

B. Modifications

It is needless to say that the present disclosure is not restricted to the above-described embodiment, and that various configurations can be made based on the descriptions made in the present specification. For example, the following configurations may be employed.

B-1. Vehicle 10 (Object of Application)

The vehicle 10 has been described in the above embodiment as being a four-wheel automobile (FIG. 1). However, this is not restrictive from the perspective of allocating electric power to the TRC MOT 52a and 52b with higher propriety than to the CRK MOT 34 at the engine 32 side when adding assistance torque Tmot_asi to the engine torque Teng, for example. The vehicle 10 may be a three-wheeled vehicle or a six-wheeled vehicle, for example.

The vehicle 10 has been described in the above embodiment as having a single engine 32 and three motors 34, 52a, and 52b as drive sources, i.e., power sources (FIG. 1). However, this is not restrictive from the perspective of allocating electric power to the TRC MOT 52a and 52b with higher propriety than to the CRK MOT 34 at the engine 32 side when adding assistance torque Tmot_asi to the engine torque Teng, for example. An arrangement may be made where there is only one of the TRC MOT 52a and 52b, for example.

The vehicle 10 has been described in the above embodiment as driving the rear wheels 30 by the rear wheel drive device 20 having the engine 32 and the first motor 34, and driving the front wheels 50 by the front wheel drive device 22 having the second and third motors 52a and 52b (FIG. 1). However, this is not restrictive from the perspective of allocating electric power to the TRC MOT 52a and 52b with higher propriety than to the CRK MOT 34 at the engine 32 side when adding assistance torque Tmot_asi to the engine torque Teng, for example.

Figure 15:
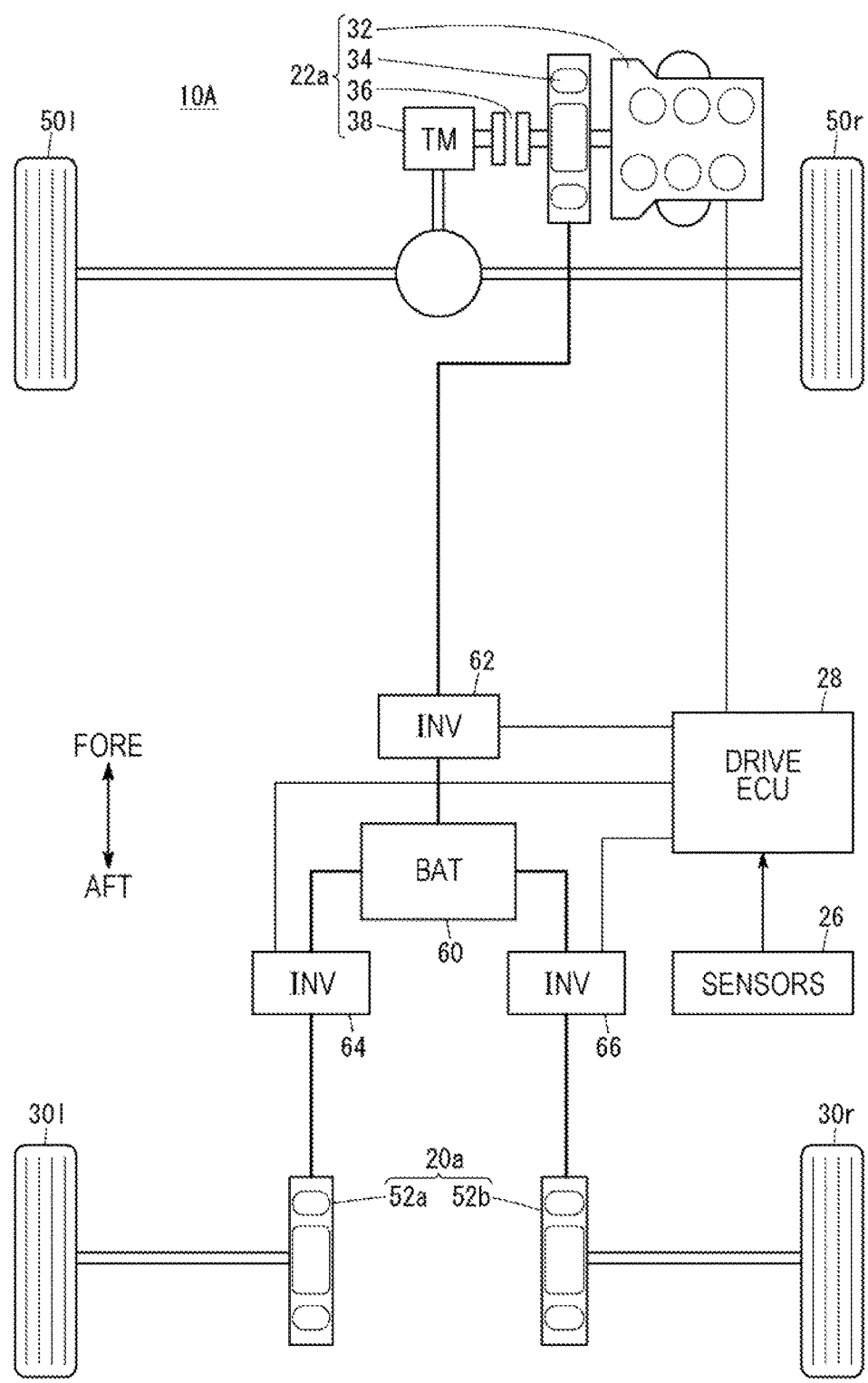
FIG. 15 is a schematic configuration diagram of a part of a vehicle according to a modification of the present disclosure.

FIG. 15 is a schematic configuration diagram of a part of a vehicle 10A according to a modification of the present disclosure. The configuration of the rear wheel drive device 20 and front wheel drive device 22 in a vehicle 10A is opposite to that of the vehicle 10 in the above-described embodiment. That is to say, a rear wheel drive device 20a of the vehicle 10A has the second and third traveling motors 52a and 52b disposed toward the rear side of the vehicle 10A. A front wheel drive device 22a of the vehicle 10A has the engine 32 and first travelling motor 34 serially disposed toward the: front side of the vehicle 10A.

The combination of the engine 32 and the CRK MOT 34 is connected to the rear wheels 30 and the TRC MOT 52a and 52b are connected to the front wheels 50 in the embodiment described above (FIG. 1). The combination of the engine 32 and the CRK MOT 34 is connected to the front wheels 50 and the TRC MOT 52a and 52b are connected to the rear wheels 30 in the modification in FIG. 15. That is to say, the wheels (first wheels) to which the combination of the engine 32 and the CRK MOT 34 are connected, and the wheels (second wheels) to which the TRC MOT 52a and 52b are connected, differ.

However, this is not restrictive from the perspective of allocating electric power to the TRC MOT 52a and 52b with higher propriety than to the CRK MOT 34 at the engine 32 side when adding assistance torque Tmot_asi to the engine torque Teng, for example. For example, the engine 32, CRK MOT 34, and TRC MOT 52a and 52b may be connected to the front wheels 50. In this case, the engine 32 and CRK MOT 34 may be connected to the front wheels 50 via the clutch 36, while the TRC MOT 52a and 52b are connected to the front wheels 50 without going through the clutch 36.

B-2. First Through Third Travelling Motors 34, 52a, and 52b

The first through third travelling motors 34, 52a, and 52b have been, described in the above embodiment as being three-phase AC brushless motors, but this is not restrictive. For example, the first through, third travelling motors 34, 52a, and 52b may be three-phase AC brushed motors, single-phase AC motors, or a DC motors. Although description has been made in the above embodiment that, the first through third travelling motors 34, 52a, and 52b receive supply of electric power from the high-voltage battery 60, electric power may be additionally supplied from a fuel cell.

B-3. Vehicle Power Control

B-3-1. Method of Setting Target Total Torque Ttotal_tar

The embodiment has been described above assuming that the driver (steering entity) riding in the vehicle 10 controls the torque of the rear wheel drive device 20 and front wheel drive device 22 based on operations of the accelerator pedal 102. However, this is not restrictive from the perspective of controlling the torque (power) of the rear wheel drive device 20 and front wheel drive device 22, for example. The present disclosure is also applicable to a configuration where the torque of the rear wheel drive device 20 and front wheel drive device 22 of the vehicle 10 is automatically controlled (a so-called autonomously driving configuration), for example. The present disclosure also is applicable to a configuration where the driver externally and remotely operates the vehicle 10.

The drive ECU 23 has been described in the above embodiment as performing control where the torque itself of the rear wheel drive device 20 and front wheel drive device 22 is the object of computation (FIG. 5). However, this is not restrictive from the perspective of controlling the torque (power) of the rear wheel drive device 20 and front wheel drive device 22, for example. The drive ECU 28 may perform control where, instead of torque, output or drive force, which are convertible to and from torque, are the object of computation, for example.

B-3-2. Target Engine Torque Teng_tar

In a case where the target total torque Ttotal_tar is not equal to or less than the maximum engine torque Teng_max (NO S16), the maximum engine torque Teng_max corresponding to the engine rotational speed Ne was described as being the target engine torque Teng_tar in the above embodiment (S19 in FIG. 5, etc.). However, this is not restrictive from the perspective that the CRK MOT assistance torque Tcrk_asi is calculated based on the difference between the maximum clutch transmission torque Tcl_max and the engine torque Teng, for example. An arrangement may foe made where, for example, the target engine torque Teng_tar is set such that the engine 32 runs at a constant engine rotational speed Ne where the gas mileage, of the engine 32 is best. In this case, the difference between the target total torque Ttotal_tar and the target engine torque Teng_tar may be generated by the CRK MOT 34 or the TRC MOT 52a and 52b.

B-3-3. Instant Assistance Control

Description has been made in the above embodiment that instant assistance control is executed (S15) when switching from MOT travelling mode to ENG travelling mode (when starting the engine 32) or the like (YES in S14 in FIG. 5). However, instant assistance control may be omitted by focusing on consecutive assistance control, for example. Conversely, consecutive assistance control may be omitted by focusing on instant assistance control.

B-3-4. Consecutive Assistance Control

B-3-4-1. Timing of Consecutive Assistance Control

The embodiment has been described above with consecutive assistance control (S19) being executed only in the second Ne region R2 (FIG. 6). However, this is not restrictive from the perspective that the CRK MOT assistance torque Tcrk_asi is calculated using the difference between the maximum clutch transmission torque Tcl_max and the engine torque Teng, for example. Consecutive assistance control may be executed in the third Ne region R3 where the operation amount θap is below Ne1, for example.

The embodiment has been described above where the timing of consecutive assistance control is determined based on the AP operation amount θap (S13 in FIG. 5). However, this is not restrictive from the perspective of generating assistance torque Tmot_asi only when the driver is requesting acceleration, for example. The consecutive assistance control may be carried out by an arrangement where, for example, determination is made regarding whether or not the vehicle 10 is cruising, based on vehicular speed V, operations of automatic cruise control, or the like, and consecutive assistance control is disallowed if cruising.

B-3-4-2. Operation Amount Threshold Value THθap

The operation amount threshold value THθap has been described in the above embodiment as being set taking into consideration the relationship with the kick-down threshold value THθkd (FIG. 7). However, this is not restrictive from the perspective of suppressing electric power consumption occurring when performing assistance by the motors 34, 52a, and 52b, for example, and the operation amount threshold value THθap may be set to another value.

B-3-4-3. MOT Assistance Torque Tmot_asi

Description has been made in the above embodiment that, in a state where the AP operation amount θap exceeds the operation amount threshold value THθap (YES in S18 in FIG. 5), the MOT assistance torque Tmot_asi is set as a value independent from the AP operation amount θap (a value that is not directly increased/decreased by increase/decrease of the AP operation amount θap) (FIGS. 9, and 12). However, this is not restrictive from the perspective of allocating electric power to the TRC MOT 52a and 52b with higher propriety than to the CRK MOT 34 at the engine 32 side when adding assistance torque Tmot_asi to the engine torque Teng, for example. An arrangement may be made where, for example, the MOT assistance torque Tmot_asi is a value dependent on the AP operation amount θap (a value that is directly increased/decreased by increase/decrease of the AP operation amount θap). Alternatively, the MOT assistance torque Tmot asi may be a value obtained by combining a value independent from the AP operation amount θap and a value dependent on the AP operation amount θap.

An arrangement has been described in the above embodiment where, in consecutive assistance control, all of the BAT discharge limit torque Tbat_lim is allowed to be allocated to the TRC MOT assistance torque Ttrc_asi, following which remaining electric power can be allocated to the CRK MOT assistance torque Tcrk_asi (FIGS. 9 and 12). However, this is not restrictive from the perspective of allocating electric power to the TRC MOT 52a and 52b with higher propriety than to the CRK MOT 34 at the engine 32 side when adding assistance torque Tmot asi to the engine torque Teng, for example. An arrangement may be made where, for example, a portion that is more than half of the BAT discharge limit torque Tbat_lim (e.g., 70 to 99%) is allowed, to be allocated to the TRC MOT assistance torque Ttrc_asi, while a portion that is less than half of the BAT discharge limit torque Tbat_lim (e.g., 1 to 30%) can be allocated to the CRK MOT assistance torque Tcrk_asi.

B-3-4-4. CRK MOT Assistance Torque Tcrk_asi

The embodiment has been described above that the difference between the maximum clutch transmission torque Tcl_max and engine torque Teng is all settable as the CRK MOT assistance torque Tcrk_asi (FIGS. 6 and 12). However, this is not restrictive from the perspective of allocating electric power to the TRC MOT 52a and 52b with higher propriety than to the CRK MOT 34 at the engine 32 side when adding assistance torque Tmot_asi to the engine torque Teng, for example. A value obtained by subtracting the engine torque Teng and an excess amount a from the maximum clutch transmission torque Tcl_max may foe set as the CRK MOT assistance torque Tcrk_asi (Tcrk_asi=Tcl_max−Teng−α), for example.

The embodiment has been described above that the difference between the maximum clutch transmission torque Tcl_max and engine torque Teng is settable as the CRK MOT assistance torque Tcrk_asi (FIG. 12). In other words, the CRK MOT assistance torque Tcrk_asi has been described as being a variable value. However, this is not restrictive from the perspective of allocating electric power to the TRC MOT 52a and 52b with higher propriety than to the CRK MOT 34 at the engine 32 side when adding assistance torque. Tmot_asi to the engine torque Teng, for example. The CRK MOT assistance torque Tcrk_asi may be a fixed value, for example.

B-3-5. Others

The description of the embodiment above has cases where comparison of numerical values includes the equal sign and cases where the equal sign is not included (S16 and S18 in FIGS. 3 and 5). However, whether or not to include the equal sign in comparison of numerical values can be optionally set unless there is no particular meaning in including or excluding the equal sign (i.e., in cases where the advantages of the present disclosure can be yielded), for example.

In light of this, the determination of whether or not the target total torque Ttotal_tar is equal to or smaller than the maximum engine torque Tenq_max in step S16 in FIG. 5 can, for example, be replaced with determination of whether or not the target total torque Ttotal_tar is smaller than the maximum engine torque Teng_max. In the same way, the determination of whether or not the AP operation amount θap is equal to or greater than the operation amount threshold value THθap in step S18 in FIG. 5 can, for example, be replaced with determination of whether or not the AP operation amount θap exceeds the operation amount threshold value THθap. On the other hand, the "ACCELERATOR PEDAL IN ON STATE (θap>0)" in FIG. 3 has a particular meaning that a case where the AP operation amount θap is zero is not included, in order to determine the on state of the accelerator pedal 102. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle comprising:
   an internal combustion engine;
   a transmission;
   a clutch interposed between the internal combustion engine and the transmission;
   a first rotating electrical machine connected to a first wheel via the clutch;
   a second rotating electrical machine connected to a second wheel or the first wheel without going through the clutch;
   an electric power storage device that supplies electric power to the first rotating electrical machine and the second rotating electrical machine; and
   a power controller that controls power of the internal combustion engine, the first rotating electrical machine, and the second rotating electrical machine,
   wherein the power controller, when adding additional power to the power of the internal combustion engine, allocates the electric power to the second rotating electrical machine with priority over the first rotating electrical machine to generate power by the second rotating electrical machine with priority over the first rotating electrical machine,
   wherein the power controller controls the power of the internal combustion engine and the second rotating electrical machine such that sum of the power of the internal combustion engine and the power of the second rotating electrical machine exceeds maximum transmission power of the clutch.

2. The vehicle according to claim 1,
   wherein the power controller:
   calculates additional power of the second rotating electrical machine by using
   a discharge limit of the electrical power storage device, and
   an output limit of the second rotating electrical machine, and
   calculates additional power of the first rotating electrical machine by using
   the discharge limit of the electric power storage device reflecting the calculated additional power of the second rotating electrical machine, and
   an output limit of the first rotating electrical machine.

3. The vehicle according to claim 2,
   wherein, in a case where an operation amount of an accelerator pedal is equal to or higher than an operation amount threshold value, and also the additional power is to be added to the power of the internal combustion engine, the power controller:
   calculates the additional power of the second rotating electrical machine by using
   the discharge limit of the electric power storage device, and
   the output limit of the second rotating electrical machine, and
   calculates the additional power of the first rotating electrical machine by using
   the discharge limit of the electric power storage device reflecting the calculated additional power of the second rotating electrical machine, and
   the output limit of the first rotating electrical machine.

4. The vehicle according to claim 3, further comprising:
a kick-down switch that performs kick-down by which the transmission is shifted down, in a case where a predetermined depressing operation has been performed at the accelerator pedal,
wherein the power controller sets the operation amount threshold value equal to a kick-down threshold value that is the operation amount where the kick-down switch turns on or a value reflecting a tolerance value in the kick-down threshold value.

5. The vehicle according to claim 2, wherein the power controller:
calculates the additional power of the second rotating electrical machine such that the additional power of the second rotating electrical machine is maximized within a range permitted by the discharge limit of the electrical power storage device and the output limit of the second rotating electrical machine, and
calculates the additional power of the first rotating electrical machine such that the additional power of the first rotating electrical machine is maximized within a range permitted by the discharge limit of the electric power storage device reflecting the calculated additional power of the second rotating electrical machine and the output limit of the first rotating electrical machine.

6. The vehicle according to claim 1,
wherein, in a case where an operation amount of an accelerator pedal is equal to or higher than an operation amount threshold value, and also the additional power is to be added to the power of the internal combustion engine, the power controller generates the power of the second rotating electrical machine with higher priority than the power of the first rotating electrical machine,
and wherein, in a case where the operation amount of the accelerator pedal is lower than the operation amount threshold value, and also the additional power is to be added to the power of the internal combustion engine, the power controller generates the power of the first rotating electrical machine with higher priority than the power of the second rotating electrical machine.

7. A vehicle comprising:
an internal combustion engine;
a transmission;
a clutch interposed between the internal combustion engine and the transmission;
a first rotating electrical machine connected to a first wheel via the clutch;
a second rotating electrical machine connected to a second wheel or the first wheel without going through the clutch;
an electric power storage device that supplies electric power to the first rotating electrical machine and the second rotating electrical machine; and
a power controller that controls power of the internal combustion engine, the first rotating electrical machine, and the second rotating electrical machine,
wherein the power controller, when adding additional power to the power of the internal combustion engine when the power of the internal combustion engine is transmitted to the transmission via the clutch, allocates the electric power to the second rotating electrical machine with priority over the first rotating electrical machine to generate power by the second rotating electrical machine with priority over the first rotating electrical machine.

8. The vehicle according to claim 7, wherein the power controller allocates the electric power to the second rotating electrical machine and the first rotating electrical machine to generate the additional power by the second rotating electrical machine and the first rotating electrical machine.

* * * * *